US009171541B2

(12) United States Patent
Kennewick et al.

(10) Patent No.: US 9,171,541 B2
(45) Date of Patent: Oct. 27, 2015

(54) SYSTEM AND METHOD FOR HYBRID PROCESSING IN A NATURAL LANGUAGE VOICE SERVICES ENVIRONMENT

(75) Inventors: Robert A. Kennewick, Seattle, WA (US); Lynn Elise Armstrong, Woodinville, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 690 days.

(21) Appl. No.: 12/703,032

(22) Filed: Feb. 9, 2010

(65) Prior Publication Data

US 2011/0112827 A1    May 12, 2011

Related U.S. Application Data

(60) Provisional application No. 61/259,827, filed on Nov. 10, 2009.

(51) Int. Cl.
*G10L 15/18* (2013.01)
*G10L 15/22* (2006.01)

(52) U.S. Cl.
CPC ........... *G10L 15/18* (2013.01); *G10L 2015/226* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G10L 15/18
USPC ............................ 704/1, 9, 10, 251, 257, 275
See application file for complete search history.

(56) References Cited

U.S. PATENT DOCUMENTS

| 4,430,669 A | 2/1984 | Cheung ......................... 358/122 |
| 4,821,027 A | 4/1989 | Mallory et al. ................ 340/521 |

(Continued)

FOREIGN PATENT DOCUMENTS

| EP | 1 320 043 A2 | 6/2003 |
| EP | 1 646 037 | 4/2006 |

(Continued)

OTHER PUBLICATIONS

Reuters, "IBM to Enable Honda Drivers to Talk to Cars", Charles Schwab & Co., Inc., Jul. 28, 2002, 1 page.

(Continued)

*Primary Examiner* — Lamont Spooner
(74) *Attorney, Agent, or Firm* — Sheppard Mullin Richter & Hampton LLP

(57) ABSTRACT

A system and method for hybrid processing in a natural language voice services environment that includes a plurality of multi-modal devices may be provided. In particular, the hybrid processing may generally include the plurality of multi-modal devices cooperatively interpreting and processing one or more natural language utterances included in one or more multi-modal requests. For example, a virtual router may receive various messages that include encoded audio corresponding to a natural language utterance contained in a multi-modal interaction provided to one or more of the devices. The virtual router may then analyze the encoded audio to select a cleanest sample of the natural language utterance and communicate with one or more other devices in the environment to determine an intent of the multi-modal interaction. The virtual router may then coordinate resolving the multi-modal interaction based on the intent of the multi-modal interaction.

31 Claims, 5 Drawing Sheets

(56) References Cited

U.S. PATENT DOCUMENTS

| | | | |
|---|---|---|---|
| 4,829,423 A | 5/1989 | Tennant et al. | 364/200 |
| 4,910,784 A | 3/1990 | Doddington et al. | 381/43 |
| 5,027,406 A | 6/1991 | Roberts et al. | 381/43 |
| 5,155,743 A | 10/1992 | Jacobs | 375/28 |
| 5,164,904 A | 11/1992 | Sumner | 364/436 |
| 5,208,748 A | 5/1993 | Flores et al. | 364/419 |
| 5,274,560 A | 12/1993 | LaRue | 364/444 |
| 5,357,596 A | 10/1994 | Takebayashi et al. | 395/2.84 |
| 5,377,350 A | 12/1994 | Skinner | 395/600 |
| 5,386,556 A | 1/1995 | Hedin et al. | 395/600 |
| 5,424,947 A | 6/1995 | Nagao et al. | 364/419.08 |
| 5,471,318 A | 11/1995 | Ahuja et al. | 358/400 |
| 5,475,733 A | 12/1995 | Eisdorfer et al. | 379/52 |
| 5,488,652 A | 1/1996 | Bielby et al. | 379/88 |
| 5,499,289 A | 3/1996 | Bruno et al. | 379/220 |
| 5,500,920 A | 3/1996 | Kupiec | 395/2.79 |
| 5,517,560 A | 5/1996 | Greenspan | 379/114 |
| 5,533,108 A | 7/1996 | Harris et al. | 379/201 |
| 5,537,436 A | 7/1996 | Bottoms et al. | 375/222 |
| 5,539,744 A | 7/1996 | Chu et al. | 370/60 |
| 5,557,667 A | 9/1996 | Bruno et al. | 379/201 |
| 5,559,864 A | 9/1996 | Kennedy, Jr. | 379/59 |
| 5,563,937 A | 10/1996 | Bruno et al. | 379/201 |
| 5,577,165 A | 11/1996 | Takebayashi et al. | 395/2.84 |
| 5,590,039 A | 12/1996 | Ikeda et al. | 395/759 |
| 5,608,635 A | 3/1997 | Tamai | 364/449.3 |
| 5,617,407 A | 4/1997 | Bareis | 369/275.3 |
| 5,633,922 A | 5/1997 | August et al. | 379/220 |
| 5,634,086 A | 5/1997 | Rtischev et al. | 395/2.79 |
| 5,652,570 A | 7/1997 | Lepkofker | 340/573 |
| 5,675,629 A | 10/1997 | Raffel et al. | 379/58 |
| 5,696,965 A | 12/1997 | Dedrick | 395/610 |
| 5,708,422 A | 1/1998 | Blonder et al. | 340/825.34 |
| 5,721,938 A | 2/1998 | Stuckey | 395/754 |
| 5,722,084 A | 2/1998 | Chakrin et al. | 455/551 |
| 5,740,256 A | 4/1998 | Castello Da Costa et al. | 361/94.7 |
| 5,742,763 A | 4/1998 | Jones | 395/200.3 |
| 5,748,841 A | 5/1998 | Morin et al. | 395/2.66 |
| 5,748,974 A | 5/1998 | Johnson | 395/759 |
| 5,752,052 A | 5/1998 | Richardson et al. | 395/759 |
| 5,754,784 A | 5/1998 | Garland et al. | 395/200.49 |
| 5,761,631 A | 6/1998 | Nasukawa | 704/9 |
| 5,774,841 A | 6/1998 | Salazar et al. | 704/225 |
| 5,774,859 A | 6/1998 | Houser et al. | 704/275 |
| 5,794,050 A | 8/1998 | Dahlgren et al. | 395/708 |
| 5,794,196 A | 8/1998 | Yegnanarayanan et al. | 704/255 |
| 5,797,112 A | 8/1998 | Komatsu et al. | 701/201 |
| 5,799,276 A | 8/1998 | Komissarchik et al. | 704/251 |
| 5,802,510 A | 9/1998 | Jones | 707/2 |
| 5,832,221 A | 11/1998 | Jones | 375/200.36 |
| 5,839,107 A | 11/1998 | Gupta et al. | 704/270 |
| 5,848,396 A | 12/1998 | Gerace | 705/10 |
| 5,855,000 A | 12/1998 | Waibel et al. | 704/235 |
| 5,867,817 A | 2/1999 | Catallo et al. | 704/255 |
| 5,878,385 A | 3/1999 | Bralich et al. | 704/9 |
| 5,878,386 A | 3/1999 | Coughlin | 704/10 |
| 5,892,813 A | 4/1999 | Morin et al. | 379/88.01 |
| 5,892,900 A | 4/1999 | Ginter et al. | 395/186 |
| 5,895,464 A | 4/1999 | Bhandari et al. | 707/3 |
| 5,895,466 A | 4/1999 | Goldberg et al. | 707/5 |
| 5,897,613 A | 4/1999 | Chan | 704/210 |
| 5,902,347 A | 5/1999 | Backman et al. | 701/200 |
| 5,911,120 A | 6/1999 | Jarett et al. | 455/417 |
| 5,918,222 A | 6/1999 | Fukui et al. | 707/1 |
| 5,926,784 A | 7/1999 | Richardson et al. | 704/9 |
| 5,933,822 A | 8/1999 | Braden-Harder et al. | 707/5 |
| 5,950,167 A | 9/1999 | Yaker | 704/275 |
| 5,953,393 A | 9/1999 | Culbreth et al. | 379/88.25 |
| 5,960,397 A | 9/1999 | Rahim | 704/244 |
| 5,960,399 A | 9/1999 | Barclay et al. | 704/270 |
| 5,960,447 A | 9/1999 | Holt et al. | 707/500 |
| 5,963,894 A | 10/1999 | Richardson et al. | 704/9 |
| 5,963,940 A | 10/1999 | Liddy et al. | 707/5 |
| 5,987,404 A | 11/1999 | Della Pietra et al. | 704/9 |
| 5,991,721 A | 11/1999 | Asano et al. | 704/257 |
| 5,995,119 A | 11/1999 | Cosatto et al. | 345/473 |
| 5,995,928 A | 11/1999 | Nguyen et al. | 704/251 |
| 6,009,382 A | 12/1999 | Martino et al. | 704/1 |
| 6,014,559 A | 1/2000 | Amin | 455/413 |
| 6,018,708 A | 1/2000 | Dahan et al. | 704/244 |
| 6,021,384 A | 2/2000 | Gorin et al. | 704/1 |
| 6,028,514 A | 2/2000 | Lemelson et al. | 340/539 |
| 6,035,267 A | 3/2000 | Watanabe et al. | 704/1 |
| 6,044,347 A | 3/2000 | Abella et al. | 704/272 |
| 6,049,602 A | 4/2000 | Foladare et al. | 379/265 |
| 6,049,607 A | 4/2000 | Marash et al. | 379/410 |
| 6,058,187 A | 5/2000 | Chen | 380/21 |
| 6,067,513 A | 5/2000 | Ishimitsu | 704/233 |
| 6,076,059 A * | 6/2000 | Glickman et al. | 704/260 |
| 6,078,886 A | 6/2000 | Dragosh et al. | 704/270 |
| 6,081,774 A | 6/2000 | De Hita et al. | 704/9 |
| 6,085,186 A | 7/2000 | Christianson et al. | 707/3 |
| 6,101,241 A | 8/2000 | Boyce et al. | 379/88.01 |
| 6,108,631 A | 8/2000 | Ruhl | 704/270 |
| 6,119,087 A | 9/2000 | Kuhn et al. | 704/270 |
| 6,122,613 A * | 9/2000 | Baker | 704/235 |
| 6,134,235 A | 10/2000 | Goldman et al. | 370/352 |
| 6,144,667 A | 11/2000 | Doshi et al. | 370/401 |
| 6,144,938 A | 11/2000 | Surace et al. | 704/257 |
| 6,154,526 A | 11/2000 | Dahlke et al. | 379/88.03 |
| 6,160,883 A | 12/2000 | Jackson et al. | 379/230 |
| 6,167,377 A | 12/2000 | Gillick et al. | 704/240 |
| 6,173,266 B1 | 1/2001 | Marx et al. | 704/270 |
| 6,173,279 B1 | 1/2001 | Levin et al. | 707/5 |
| 6,175,858 B1 | 1/2001 | Bulfer et al. | 709/206 |
| 6,185,535 B1 | 2/2001 | Hedin et al. | 704/270 |
| 6,188,982 B1 | 2/2001 | Chiang | 704/256 |
| 6,192,110 B1 | 2/2001 | Abella et al. | 379/88.01 |
| 6,192,338 B1 | 2/2001 | Haszto et al. | 704/257 |
| 6,195,634 B1 | 2/2001 | Dudemaine et al. | 704/231 |
| 6,195,651 B1 | 2/2001 | Handel et al. | 707/2 |
| 6,199,043 B1 | 3/2001 | Happ | 704/272 |
| 6,208,964 B1 | 3/2001 | Sabourin | 704/244 |
| 6,208,972 B1 | 3/2001 | Grant et al. | 704/275 |
| 6,219,346 B1 | 4/2001 | Maxemchuk | 370/338 |
| 6,219,643 B1 | 4/2001 | Cohen et al. | 704/257 |
| 6,226,612 B1 | 5/2001 | Srenger et al. | 704/256 |
| 6,233,556 B1 | 5/2001 | Teunen et al. | 704/250 |
| 6,233,559 B1 | 5/2001 | Balakrishnan | 704/275 |
| 6,233,561 B1 | 5/2001 | Junqua et al. | 704/277 |
| 6,236,968 B1 | 5/2001 | Kanevsky et al. | 704/275 |
| 6,246,981 B1 | 6/2001 | Papineni et al. | 704/235 |
| 6,246,990 B1 | 6/2001 | Happ | 704/275 |
| 6,266,636 B1 | 7/2001 | Kosaka et al. | 704/244 |
| 6,269,336 B1 | 7/2001 | Ladd et al. | 704/270 |
| 6,272,455 B1 | 8/2001 | Hoshen et al. | 704/1 |
| 6,275,231 B1 | 8/2001 | Obradovich | 345/349 |
| 6,278,377 B1 | 8/2001 | DeLine et al. | 340/815.4 |
| 6,278,968 B1 | 8/2001 | Franz et al. | 704/3 |
| 6,288,319 B1 | 9/2001 | Catona | 84/609 |
| 6,292,767 B1 | 9/2001 | Jackson et al. | 704/1 |
| 6,301,560 B1 | 10/2001 | Masters | 704/251 |
| 6,308,151 B1 | 10/2001 | Smith | 704/235 |
| 6,311,159 B1 | 10/2001 | Van Tichelen et al. | 704/275 |
| 6,314,402 B1 | 11/2001 | Monaco et al. | 704/275 |
| 6,321,196 B1 | 11/2001 | Franceschi | 704/243 |
| 6,356,869 B1 | 3/2002 | Chapados et al. | 704/275 |
| 6,362,748 B1 | 3/2002 | Huang | 340/901 |
| 6,366,882 B1 | 4/2002 | Bijl et al. | 704/235 |
| 6,366,886 B1 | 4/2002 | Dragosh et al. | 704/270.1 |
| 6,374,214 B1 | 4/2002 | Friedland et al. | 704/235 |
| 6,377,913 B1 | 4/2002 | Coffman et al. | 704/8 |
| 6,381,535 B1 | 4/2002 | Durocher et al. | 701/202 |
| 6,385,596 B1 | 5/2002 | Wiser et al. | 705/51 |
| 6,385,646 B1 | 5/2002 | Brown et al. | 709/217 |
| 6,393,403 B1 | 5/2002 | Majaniemi | 704/270 |
| 6,393,428 B1 | 5/2002 | Miller et al. | 707/102 |
| 6,397,181 B1 | 5/2002 | Li et al. | 704/256 |
| 6,404,878 B1 | 6/2002 | Jackson et al. | 379/221.01 |
| 6,405,170 B1 | 6/2002 | Phillips et al. | 704/270 |
| 6,408,272 B1 | 6/2002 | White et al. | 704/270.1 |
| 6,411,810 B1 | 6/2002 | Maxemchuk | 455/453 |
| 6,411,893 B2 | 6/2002 | Ruhl | 701/207 |

(56) References Cited

U.S. PATENT DOCUMENTS

| | | | | |
|---|---|---|---|---|
| 6,415,257 | B1 | 7/2002 | Junqua et al. | 704/275 |
| 6,418,210 | B1 | 7/2002 | Sayko | 379/142.15 |
| 6,420,975 | B1 | 7/2002 | DeLine et al. | 340/815.4 |
| 6,429,813 | B2 | 8/2002 | Feigen | 342/357.13 |
| 6,430,285 | B1 | 8/2002 | Bauer et al. | 379/265.01 |
| 6,430,531 | B1 | 8/2002 | Polish | 704/257 |
| 6,434,523 | B1 | 8/2002 | Monaco | 704/257 |
| 6,434,524 | B1 | 8/2002 | Weber | 704/257 |
| 6,434,529 | B1 | 8/2002 | Walker et al. | 704/275 |
| 6,442,522 | B1 | 8/2002 | Carberry et al. | 704/257 |
| 6,446,114 | B1 | 9/2002 | Bulfer et al. | 709/206 |
| 6,453,153 | B1 | 9/2002 | Bowker et al. | 455/67.4 |
| 6,453,292 | B2 | 9/2002 | Ramaswamy et al. | 704/235 |
| 6,456,711 | B1 | 9/2002 | Cheung et al. | 379/265.09 |
| 6,456,974 | B1 | 9/2002 | Baker et al. | 704/270.1 |
| 6,466,654 | B1 | 10/2002 | Cooper et al. | 379/88.01 |
| 6,466,899 | B1 | 10/2002 | Yano et al. | 704/1 |
| 6,470,315 | B1 | 10/2002 | Netsch et al. | 704/256 |
| 6,487,494 | B2 | 11/2002 | Odinak et al. | 701/202 |
| 6,487,495 | B1 | 11/2002 | Gale et al. | 701/209 |
| 6,498,797 | B1 | 12/2002 | Anerousis et al. | 370/522 |
| 6,499,013 | B1 | 12/2002 | Weber | 704/275 |
| 6,501,833 | B2 | 12/2002 | Phillips et al. | 379/88.07 |
| 6,501,834 | B1 | 12/2002 | Milewski et al. | 379/93.24 |
| 6,505,155 | B1 | 1/2003 | Vanbuskirk et al. | 704/246 |
| 6,510,417 | B1 | 1/2003 | Quilici et al. | 704/275 |
| 6,513,006 | B2 | 1/2003 | Howard et al. | 704/257 |
| 6,522,746 | B1 | 2/2003 | Marchok et al. | 379/406.03 |
| 6,523,061 | B1 | 2/2003 | Halverson et al. | 709/202 |
| 6,532,444 | B1 | 3/2003 | Weber | 704/257 |
| 6,539,348 | B1 | 3/2003 | Bond et al. | 704/9 |
| 6,549,629 | B2 | 4/2003 | Finn et al. | 381/92 |
| 6,553,372 | B1 | 4/2003 | Brassell et al. | 707/5 |
| 6,556,970 | B1 | 4/2003 | Sasaki et al. | 704/257 |
| 6,556,973 | B1 | 4/2003 | Lewin | 704/277 |
| 6,560,576 | B1 | 5/2003 | Cohen et al. | 704/270 |
| 6,560,590 | B1 | 5/2003 | Shwe et al. | 706/55 |
| 6,567,778 | B1 | 5/2003 | Chao Chang et al. | 704/257 |
| 6,567,797 | B1 | 5/2003 | Schuetze et al. | 707/2 |
| 6,570,555 | B1 | 5/2003 | Prevost et al. | 345/156 |
| 6,570,964 | B1 | 5/2003 | Murveit et al. | 379/67.1 |
| 6,571,279 | B1 | 5/2003 | Herz et al. | 709/217 |
| 6,574,597 | B1 | 6/2003 | Mohri et al. | 704/251 |
| 6,574,624 | B1 | 6/2003 | Johnson et al. | 707/5 |
| 6,578,022 | B1 | 6/2003 | Foulger et al. | 706/45 |
| 6,581,103 | B1 | 6/2003 | Dengler | 709/231 |
| 6,584,439 | B1 | 6/2003 | Geilhufe et al. | 704/270 |
| 6,587,858 | B1 | 7/2003 | Strazza | 707/102 |
| 6,591,239 | B1 | 7/2003 | McCall et al. | 704/275 |
| 6,594,257 | B1 | 7/2003 | Doshi et al. | 370/352 |
| 6,594,367 | B1 | 7/2003 | Marash et al. | 381/92 |
| 6,598,018 | B1 | 7/2003 | Junqua | 704/251 |
| 6,601,026 | B2 | 7/2003 | Appelt et al. | 704/9 |
| 6,604,075 | B1 | 8/2003 | Brown et al. | 704/270.1 |
| 6,604,077 | B2 | 8/2003 | Dragosh et al. | 704/270.1 |
| 6,606,598 | B1 | 8/2003 | Holthouse et al. | 704/275 |
| 6,611,692 | B2 | 8/2003 | Raffel et al. | 455/552 |
| 6,614,773 | B1 | 9/2003 | Maxemchuk | 370/337 |
| 6,615,172 | B1 | 9/2003 | Bennett et al. | 704/257 |
| 6,622,119 | B1 | 9/2003 | Ramaswamy et al. | 704/9 |
| 6,629,066 | B1 | 9/2003 | Jackson et al. | 704/9 |
| 6,631,346 | B1 | 10/2003 | Karaorman et al. | 704/9 |
| 6,631,351 | B1 | 10/2003 | Ramachandran et al. | 704/270 |
| 6,633,846 | B1 | 10/2003 | Bennett et al. | 704/257 |
| 6,636,790 | B1 | 10/2003 | Lightner et al. | 701/33 |
| 6,643,620 | B1 | 11/2003 | Contolini et al. | 704/270 |
| 6,647,363 | B2 | 11/2003 | Claassen | 704/1 |
| 6,650,747 | B1 | 11/2003 | Bala et al. | 379/265.06 |
| 6,658,388 | B1 | 12/2003 | Kleindienst et al. | 704/275 |
| 6,678,680 | B1 | 1/2004 | Woo | 707/6 |
| 6,681,206 | B1 | 1/2004 | Gorin et al. | 704/243 |
| 6,691,151 | B1 | 2/2004 | Cheyer et al. | 709/202 |
| 6,701,294 | B1 | 3/2004 | Ball et al. | 704/257 |
| 6,704,396 | B2 * | 3/2004 | Parolkar et al. | 379/88.17 |
| 6,704,576 | B1 | 3/2004 | Brachman et al. | 455/503 |
| 6,704,708 | B1 | 3/2004 | Pickering | 704/235 |
| 6,707,421 | B1 | 3/2004 | Drury et al. | 342/357.1 |
| 6,708,150 | B1 | 3/2004 | Hirayama et al. | 704/243 |
| 6,721,001 | B1 | 4/2004 | Berstis | 348/231.3 |
| 6,721,633 | B2 | 4/2004 | Funk et al. | 701/1 |
| 6,721,706 | B1 | 4/2004 | Strubbe et al. | 704/275 |
| 6,726,636 | B2 | 4/2004 | Der Ghazarian et al. | 600/532 |
| 6,735,592 | B1 | 5/2004 | Neumann et al. | 707/101 |
| 6,739,556 | B1 | 5/2004 | Langston | 244/189 |
| 6,741,931 | B1 | 5/2004 | Kohut et al. | 701/209 |
| 6,742,021 | B1 | 5/2004 | Halverson et al. | 709/218 |
| 6,745,161 | B1 | 6/2004 | Arnold et al. | 704/7 |
| 6,751,591 | B1 | 6/2004 | Gorin et al. | 704/257 |
| 6,751,612 | B1 | 6/2004 | Schuetze et al. | 707/4 |
| 6,754,485 | B1 | 6/2004 | Obradovich et al. | 455/414.1 |
| 6,754,627 | B2 | 6/2004 | Woodward | 704/235 |
| 6,757,544 | B2 | 6/2004 | Rangarajan et al. | 455/456.1 |
| 6,757,718 | B1 | 6/2004 | Halverson et al. | 709/218 |
| 6,795,808 | B1 | 9/2004 | Strubbe et al. | 704/275 |
| 6,801,604 | B2 * | 10/2004 | Maes et al. | 379/88.17 |
| 6,801,893 | B1 | 10/2004 | Backfried et al. | 704/257 |
| 6,813,341 | B1 | 11/2004 | Mahoney | 379/88.01 |
| 6,829,603 | B1 | 12/2004 | Wolf et al. | 707/5 |
| 6,832,230 | B1 | 12/2004 | Zilliacus et al. | 707/203 |
| 6,833,848 | B1 | 12/2004 | Wolff et al. | 345/719 |
| 6,850,603 | B1 * | 2/2005 | Eberle et al. | 379/88.16 |
| 6,856,990 | B2 | 2/2005 | Barile et al. | 707/10 |
| 6,865,481 | B2 | 3/2005 | Kawazoe et al. | 701/211 |
| 6,868,380 | B2 | 3/2005 | Kroeker | 704/240 |
| 6,868,385 | B1 | 3/2005 | Gerson | 704/275 |
| 6,873,837 | B1 | 3/2005 | Yoshioka et al. | 455/321 |
| 6,877,001 | B2 | 4/2005 | Wolf et al. | 707/3 |
| 6,877,134 | B1 | 4/2005 | Fuller et al. | 715/500.1 |
| 6,901,366 | B1 | 5/2005 | Kuhn et al. | 704/275 |
| 6,910,003 | B1 | 6/2005 | Arnold et al. | 704/4 |
| 6,912,498 | B2 | 6/2005 | Stevens et al. | 704/235 |
| 6,915,126 | B2 | 7/2005 | Mazzara, Jr. | 455/411 |
| 6,928,614 | B1 | 8/2005 | Everhart | 715/728 |
| 6,934,756 | B2 * | 8/2005 | Maes | 709/227 |
| 6,937,977 | B2 | 8/2005 | Gerson | 704/201 |
| 6,937,982 | B2 | 8/2005 | Kitaoka et al. | 704/252 |
| 6,941,266 | B1 | 9/2005 | Gorin et al. | 704/257 |
| 6,944,594 | B2 | 9/2005 | Busayapongchai et al. | 704/275 |
| 6,950,821 | B2 | 9/2005 | Faybishenko et al. | 707/10 |
| 6,954,755 | B2 | 10/2005 | Reisman | 707/10 |
| 6,959,276 | B2 | 10/2005 | Droppo et al. | 704/226 |
| 6,961,700 | B2 | 11/2005 | Mitchell et al. | 704/235 |
| 6,963,759 | B1 | 11/2005 | Gerson | 455/563 |
| 6,964,023 | B2 | 11/2005 | Maes et al. | 715/811 |
| 6,968,311 | B2 | 11/2005 | Knockeart et al. | 704/270 |
| 6,973,387 | B2 | 12/2005 | Masclet et al. | 701/211 |
| 6,975,993 | B1 | 12/2005 | Keiller | 704/275 |
| 6,980,092 | B2 | 12/2005 | Turnbull et al. | 340/425.5 |
| 6,983,055 | B2 | 1/2006 | Luo | 381/313 |
| 6,990,513 | B2 | 1/2006 | Belfiore et al. | 709/203 |
| 6,996,531 | B2 | 2/2006 | Korall et al. | 704/270 |
| 7,003,463 | B1 | 2/2006 | Maes et al. | 704/270.1 |
| 7,016,849 | B2 | 3/2006 | Arnold et al. | 704/275 |
| 7,020,609 | B2 | 3/2006 | Thrift et al. | 704/270.1 |
| 7,024,364 | B2 | 4/2006 | Guerra et al. | 704/270 |
| 7,027,586 | B2 * | 4/2006 | Bushey et al. | 379/265.09 |
| 7,027,975 | B1 | 4/2006 | Pazandak et al. | 704/9 |
| 7,035,415 | B2 | 4/2006 | Belt et al. | 381/92 |
| 7,036,128 | B1 | 4/2006 | Julia et al. | 719/317 |
| 7,043,425 | B2 | 5/2006 | Pao | 704/211 |
| 7,054,817 | B2 | 5/2006 | Shao | 704/270 |
| 7,058,890 | B2 | 6/2006 | George et al. | 715/728 |
| 7,062,488 | B1 | 6/2006 | Reisman | 707/8 |
| 7,069,220 | B2 | 6/2006 | Coffman et al. | 704/275 |
| 7,072,834 | B2 | 7/2006 | Zhou | 704/244 |
| 7,076,362 | B2 | 7/2006 | Ohtsuji et al. | 701/211 |
| 7,082,469 | B2 | 7/2006 | Gold et al. | 709/231 |
| 7,085,708 | B2 | 8/2006 | Manson | 704/9 |
| 7,092,928 | B1 | 8/2006 | Elad et al. | 706/60 |
| 7,107,210 | B2 | 9/2006 | Deng et al. | 704/226 |
| 7,107,218 | B1 | 9/2006 | Preston | 704/270 |
| 7,110,951 | B1 | 9/2006 | Lemelson et al. | 704/270 |
| 7,127,395 | B1 | 10/2006 | Gorin et al. | 704/257 |
| 7,127,400 | B2 | 10/2006 | Koch | 704/270.1 |

(56) References Cited

U.S. PATENT DOCUMENTS

| | | | |
|---|---|---|---|
| 7,130,390 B2 * | 10/2006 | Abburi | 379/88.17 |
| 7,136,875 B2 | 11/2006 | Anderson et al. | 707/104.1 |
| 7,137,126 B1 * | 11/2006 | Coffman et al. | 719/328 |
| 7,143,037 B1 | 11/2006 | Chestnut | 704/251 |
| 7,143,039 B1 | 11/2006 | Stifelman et al. | 704/270 |
| 7,146,319 B2 | 12/2006 | Hunt | 704/254 |
| 7,149,696 B2 | 12/2006 | Shimizu et al. | 705/1 |
| 7,165,028 B2 | 1/2007 | Gong | 704/233 |
| 7,170,993 B2 | 1/2007 | Anderson et al. | 379/265.09 |
| 7,171,291 B2 | 1/2007 | Obradovich | 701/29 |
| 7,174,300 B2 | 2/2007 | Bush | 704/275 |
| 7,177,798 B2 | 2/2007 | Hsu et al. | 704/9 |
| 7,184,957 B2 | 2/2007 | Brookes et al. | 704/246 |
| 7,190,770 B2 | 3/2007 | Ando et al. | 379/88.01 |
| 7,197,069 B2 | 3/2007 | Agazzi et al. | 375/233 |
| 7,197,460 B1 | 3/2007 | Gupta et al. | 704/270.1 |
| 7,203,644 B2 | 4/2007 | Anderson et al. | 704/246 |
| 7,206,418 B2 | 4/2007 | Yang et al. | 381/92 |
| 7,207,011 B2 | 4/2007 | Mulvey et al. | 715/812 |
| 7,215,941 B2 | 5/2007 | Beckmann et al. | 455/404.1 |
| 7,228,276 B2 | 6/2007 | Omote et al. | 704/243 |
| 7,231,343 B1 | 6/2007 | Treadgold et al. | 704/9 |
| 7,236,923 B1 | 6/2007 | Gupta | 704/9 |
| 7,254,482 B2 | 8/2007 | Kawasaki et al. | 701/211 |
| 7,272,212 B2 * | 9/2007 | Eberle et al. | 379/88.17 |
| 7,277,854 B2 | 10/2007 | Bennett et al. | 704/257 |
| 7,283,829 B2 * | 10/2007 | Christenson et al. | 455/461 |
| 7,283,951 B2 | 10/2007 | Marchisio et al. | 704/9 |
| 7,289,606 B2 | 10/2007 | Sibal et al. | 379/52 |
| 7,299,186 B2 | 11/2007 | Kuzunuki et al. | 704/270.1 |
| 7,301,093 B2 | 11/2007 | Sater et al. | 84/615 |
| 7,305,381 B1 | 12/2007 | Poppink et al. | 1/1 |
| 7,321,850 B2 | 1/2008 | Wakita | 704/10 |
| 7,328,155 B2 | 2/2008 | Endo et al. | 704/251 |
| 7,337,116 B2 | 2/2008 | Charlesworth et al. | 704/254 |
| 7,340,040 B1 | 3/2008 | Saylor et al. | 379/67.1 |
| 7,366,285 B2 * | 4/2008 | Parolkar et al. | 379/88.17 |
| 7,366,669 B2 | 4/2008 | Nishitani et al. | 704/256 |
| 7,376,645 B2 | 5/2008 | Bernard | 707/3 |
| 7,386,443 B1 | 6/2008 | Parthasarathy et al. | 704/201 |
| 7,398,209 B2 | 7/2008 | Kennewick et al. | 704/255 |
| 7,406,421 B2 | 7/2008 | Odinak et al. | 704/275 |
| 7,415,414 B2 | 8/2008 | Azara et al. | 704/270 |
| 7,421,393 B1 | 9/2008 | Di Fabbrizio et al. | 704/275 |
| 7,424,431 B2 | 9/2008 | Greene et al. | 704/270 |
| 7,447,635 B1 | 11/2008 | Konopka et al. | 704/275 |
| 7,451,088 B1 | 11/2008 | Ehlen et al. | 704/270.1 |
| 7,454,608 B2 * | 11/2008 | Gopalakrishnan et al. | 713/100 |
| 7,461,059 B2 | 12/2008 | Richardson et al. | 707/5 |
| 7,472,020 B2 | 12/2008 | Brülle-Drews | 701/211 |
| 7,472,060 B1 | 12/2008 | Gorin et al. | 704/240 |
| 7,472,075 B2 | 12/2008 | Odinak et al. | 705/26 |
| 7,477,909 B2 | 1/2009 | Roth | 455/466 |
| 7,478,036 B2 | 1/2009 | Shen et al. | 704/9 |
| 7,487,088 B1 | 2/2009 | Gorin et al. | 704/240 |
| 7,487,110 B2 | 2/2009 | Bennett et al. | 705/26 |
| 7,493,259 B2 | 2/2009 | Jones et al. | 704/257 |
| 7,493,559 B1 | 2/2009 | Wolff et al. | 715/727 |
| 7,502,672 B1 | 3/2009 | Kolls | 701/29 |
| 7,502,738 B2 | 3/2009 | Kennewick et al. | 704/257 |
| 7,516,076 B2 | 4/2009 | Walker et al. | 704/275 |
| 7,529,675 B2 * | 5/2009 | Maes | 704/270.1 |
| 7,536,297 B2 | 5/2009 | Byrd et al. | 704/10 |
| 7,536,374 B2 | 5/2009 | Au | 706/55 |
| 7,542,894 B2 | 6/2009 | Murata | 704/9 |
| 7,546,382 B2 * | 6/2009 | Healey et al. | 709/246 |
| 7,548,491 B2 | 6/2009 | Macfarlane | 367/198 |
| 7,552,054 B1 | 6/2009 | Stifelman et al. | 704/270 |
| 7,558,730 B2 | 7/2009 | Davis et al. | 704/235 |
| 7,574,362 B2 | 8/2009 | Walker et al. | 704/275 |
| 7,577,244 B2 | 8/2009 | Taschereau | 379/218.01 |
| 7,606,708 B2 | 10/2009 | Hwang | 704/257 |
| 7,620,549 B2 | 11/2009 | Di Cristo et al. | 704/257 |
| 7,634,409 B2 | 12/2009 | Kennewick et al. | 704/257 |
| 7,640,006 B2 * | 12/2009 | Portman et al. | 455/412.1 |
| 7,640,160 B2 | 12/2009 | Di Cristo et al. | 704/257 |
| 7,640,272 B2 | 12/2009 | Mahajan et al. | 707/104.1 |
| 7,676,365 B2 | 3/2010 | Hwang et al. | 704/240 |
| 7,676,369 B2 | 3/2010 | Fujimoto et al. | 704/270 |
| 7,684,977 B2 | 3/2010 | Morikawa | 704/211 |
| 7,693,720 B2 | 4/2010 | Kennewick et al. | 704/275 |
| 7,729,916 B2 * | 6/2010 | Coffman et al. | 704/270 |
| 7,729,918 B2 | 6/2010 | Walker et al. | 704/275 |
| 7,729,920 B2 | 6/2010 | Chaar et al. | 704/275 |
| 7,734,287 B2 | 6/2010 | Ying | 455/423 |
| 7,748,021 B2 | 6/2010 | Obradovich | 725/105 |
| 7,788,084 B2 | 8/2010 | Brun et al. | 704/7 |
| 7,801,731 B2 | 9/2010 | Odinak et al. | 704/275 |
| 7,809,570 B2 | 10/2010 | Kennewick et al. | 704/257 |
| 7,818,176 B2 | 10/2010 | Freeman et al. | 704/270 |
| 7,831,426 B2 | 11/2010 | Bennett | 704/252 |
| 7,831,433 B1 | 11/2010 | Belvin et al. | 704/275 |
| 7,856,358 B2 | 12/2010 | Ho | 704/270 |
| 7,873,519 B2 | 1/2011 | Bennett | 704/257 |
| 7,873,523 B2 | 1/2011 | Potter et al. | 704/275 |
| 7,873,654 B2 | 1/2011 | Bernard | 707/769 |
| 7,881,936 B2 | 2/2011 | Longé et al. | 704/257 |
| 7,890,324 B2 * | 2/2011 | Bangalore et al. | 704/231 |
| 7,894,849 B2 | 2/2011 | Kass et al. | 455/550.1 |
| 7,902,969 B2 | 3/2011 | Obradovich | 340/439 |
| 7,917,367 B2 | 3/2011 | Di Cristo et al. | 704/270.1 |
| 7,920,682 B2 | 4/2011 | Byrne et al. | 379/88.18 |
| 7,949,529 B2 | 5/2011 | Weider et al. | 704/270 |
| 7,949,537 B2 | 5/2011 | Walker et al. | 704/275 |
| 7,953,732 B2 | 5/2011 | Frank et al. | 707/724 |
| 7,974,875 B1 | 7/2011 | Quilici et al. | 705/14.4 |
| 7,983,917 B2 | 7/2011 | Kennewick et al. | 704/257 |
| 7,984,287 B2 * | 7/2011 | Gopalakrishnan et al. | 713/100 |
| 8,005,683 B2 | 8/2011 | Tessel et al. | 704/275 |
| 8,015,006 B2 | 9/2011 | Kennewick et al. | 704/236 |
| 8,060,367 B2 | 11/2011 | Keaveney | 704/247 |
| 8,069,046 B2 | 11/2011 | Kennewick et al. | 704/257 |
| 8,073,681 B2 | 12/2011 | Baldwin et al. | 704/9 |
| 8,077,975 B2 | 12/2011 | Ma et al. | 382/187 |
| 8,082,153 B2 * | 12/2011 | Coffman et al. | 704/270 |
| 8,086,463 B2 | 12/2011 | Ativanichayaphong et al. | 704/275 |
| 8,112,275 B2 | 2/2012 | Kennewick et al. | 704/240 |
| 8,140,327 B2 | 3/2012 | Kennewick et al. | 704/226 |
| 8,140,335 B2 | 3/2012 | Kennewick et al. | 704/257 |
| 8,145,489 B2 | 3/2012 | Freeman et al. | 704/257 |
| 8,150,694 B2 | 4/2012 | Kennewick et al. | 704/257 |
| 8,155,962 B2 | 4/2012 | Kennewick et al. | 704/257 |
| 8,170,867 B2 | 5/2012 | Germain | 704/9 |
| 8,195,468 B2 | 6/2012 | Weider et al. | 704/275 |
| 8,200,485 B1 | 6/2012 | Lee | 704/231 |
| 8,219,399 B2 | 7/2012 | Lutz et al. | 704/270 |
| 8,219,599 B2 | 7/2012 | Tunstall-Pedoe | 707/955 |
| 8,224,652 B2 * | 7/2012 | Wang et al. | 704/275 |
| 8,255,224 B2 | 8/2012 | Singleton et al. | 704/275 |
| 8,326,627 B2 | 12/2012 | Kennewick et al. | 704/257 |
| 8,326,634 B2 | 12/2012 | Di Cristo et al. | 704/270.1 |
| 8,326,637 B2 | 12/2012 | Baldwin et al. | 704/275 |
| 8,332,224 B2 | 12/2012 | Di Cristo et al. | 704/257 |
| 8,370,147 B2 | 2/2013 | Kennewick et al. | 704/257 |
| 8,447,607 B2 | 5/2013 | Weider et al. | 704/250 |
| 8,452,598 B2 | 5/2013 | Kennewick et al. | 704/257 |
| 8,509,403 B2 | 8/2013 | Chiu et al. | 379/114.13 |
| 8,515,765 B2 | 8/2013 | Baldwin et al. | 704/275 |
| 8,527,274 B2 | 9/2013 | Freeman et al. | 704/257 |
| 8,589,161 B2 | 11/2013 | Kennewick et al. | 704/252 |
| 8,620,659 B2 | 12/2013 | Di Cristo et al. | 704/257 |
| 8,719,009 B2 | 5/2014 | Baldwin et al. | 704/9 |
| 8,719,026 B2 | 5/2014 | Kennewick et al. | 704/257 |
| 8,731,929 B2 | 5/2014 | Kennewick et al. | 704/257 |
| 8,738,380 B2 | 5/2014 | Baldwin et al. | 704/257 |
| 8,849,652 B2 | 9/2014 | Weider et al. | 704/9 |
| 8,849,670 B2 | 9/2014 | Di Cristo et al. | 704/270.1 |
| 8,886,536 B2 | 11/2014 | Freeman et al. | 704/257 |
| 8,983,839 B2 | 3/2015 | Kennewick et al. | 704/254 |
| 9,015,049 B2 | 4/2015 | Baldwin et al. | 704/257 |
| 2001/0039492 A1 | 11/2001 | Nemoto | 704/231 |
| 2001/0041980 A1 | 11/2001 | Howard et al. | 704/270 |
| 2001/0049601 A1 | 12/2001 | Kroeker et al. | 704/254 |

(56) References Cited

U.S. PATENT DOCUMENTS

| | | |
|---|---|---|
| 2001/0054087 A1* | 12/2001 | Flom et al. ............... 709/218 |
| 2002/0015500 A1 | 2/2002 | Belt et al. ................. 381/66 |
| 2002/0022927 A1 | 2/2002 | Lemelson et al. .......... 701/301 |
| 2002/0029261 A1 | 3/2002 | Shibata ..................... 709/219 |
| 2002/0032752 A1 | 3/2002 | Gold et al. ................. 709/218 |
| 2002/0035501 A1 | 3/2002 | Handel et al. .............. 705/10 |
| 2002/0040297 A1 | 4/2002 | Tsiao et al. ................ 704/257 |
| 2002/0049535 A1 | 4/2002 | Rigo et al. ................. 701/211 |
| 2002/0049805 A1 | 4/2002 | Yamada et al. ............. 709/202 |
| 2002/0059068 A1 | 5/2002 | Rose et al. ................. 704/246 |
| 2002/0065568 A1 | 5/2002 | Silfvast et al. ............. 700/94 |
| 2002/0067839 A1 | 6/2002 | Heinrich .................... 381/110 |
| 2002/0069059 A1 | 6/2002 | Smith ........................ 704/257 |
| 2002/0069071 A1 | 6/2002 | Knockeart et al. ......... 704/275 |
| 2002/0082911 A1 | 6/2002 | Dunn et al. ................ 705/14 |
| 2002/0087312 A1 | 7/2002 | Lee et al. ................... 704/251 |
| 2002/0087326 A1 | 7/2002 | Lee et al. ................... 704/270.1 |
| 2002/0087525 A1 | 7/2002 | Abbott et al. .............. 707/3 |
| 2002/0107694 A1 | 8/2002 | Lerg ........................ 704/273 |
| 2002/0120609 A1 | 8/2002 | Lang et al. ................. 707/1 |
| 2002/0124050 A1 | 9/2002 | Middeljans ................ 709/203 |
| 2002/0133354 A1 | 9/2002 | Ross et al. .................. 704/275 |
| 2002/0133402 A1 | 9/2002 | Faber et al. ................. 705/14 |
| 2002/0135618 A1 | 9/2002 | Maes et al. ................. 345/767 |
| 2002/0138248 A1 | 9/2002 | Corston-Oliver et al. .... 704/1 |
| 2002/0143532 A1* | 10/2002 | McLean et al. ............. 704/235 |
| 2002/0143535 A1 | 10/2002 | Kist et al. ................... 704/251 |
| 2002/0161646 A1 | 10/2002 | Gailey et al. ............... 705/14 |
| 2002/0173333 A1 | 11/2002 | Buchholz et al. ........... 455/527 |
| 2002/0173961 A1* | 11/2002 | Guerra ...................... 704/258 |
| 2002/0184373 A1* | 12/2002 | Maes ......................... 709/228 |
| 2002/0188602 A1 | 12/2002 | Stubler et al. ............... 707/3 |
| 2002/0198714 A1 | 12/2002 | Zhou ........................ 704/252 |
| 2003/0014261 A1 | 1/2003 | Kageyama ................. 704/275 |
| 2003/0016835 A1 | 1/2003 | Elko et al. .................. 381/92 |
| 2003/0046346 A1 | 3/2003 | Mumick et al. ............ 709/205 |
| 2003/0064709 A1 | 4/2003 | Gailey et al. ............... 455/412 |
| 2003/0065427 A1 | 4/2003 | Funk et al. ................. 701/1 |
| 2003/0069734 A1 | 4/2003 | Everhart ................... 704/275 |
| 2003/0088421 A1* | 5/2003 | Maes et al. ................. 704/270.1 |
| 2003/0097249 A1 | 5/2003 | Walker et al. .............. 704/1 |
| 2003/0110037 A1 | 6/2003 | Walker et al. .............. 704/257 |
| 2003/0112267 A1 | 6/2003 | Belrose ..................... 345/728 |
| 2003/0115062 A1 | 6/2003 | Walker et al. .............. 704/258 |
| 2003/0120493 A1 | 6/2003 | Gupta ....................... 704/270.1 |
| 2003/0135488 A1 | 7/2003 | Amir et al. ................. 707/3 |
| 2003/0144846 A1 | 7/2003 | Denenberg et al. ......... 704/277 |
| 2003/0158731 A1 | 8/2003 | Falcon et al. ............... 704/231 |
| 2003/0161448 A1* | 8/2003 | Parolkar et al. ............ 379/88.17 |
| 2003/0182132 A1 | 9/2003 | Niemoeller ................ 704/275 |
| 2003/0204492 A1 | 10/2003 | Wolf et al. ................. 707/3 |
| 2003/0206640 A1 | 11/2003 | Malvar et al. .............. 381/93 |
| 2003/0212550 A1 | 11/2003 | Ubale ....................... 704/215 |
| 2003/0212558 A1* | 11/2003 | Matula ...................... 704/260 |
| 2003/0212562 A1 | 11/2003 | Patel et al. ................. 704/275 |
| 2003/0225825 A1* | 12/2003 | Healey et al. .............. 709/203 |
| 2003/0236664 A1 | 12/2003 | Sharma ..................... 704/251 |
| 2004/0006475 A1 | 1/2004 | Ehlen et al. ................ 704/270.1 |
| 2004/0010358 A1 | 1/2004 | Oesterling et al. .......... 701/49 |
| 2004/0025115 A1 | 2/2004 | Sienel et al. ................ 715/513 |
| 2004/0044516 A1 | 3/2004 | Kennewick et al. ........ 704/5 |
| 2004/0098245 A1 | 5/2004 | Walker et al. .............. 704/1 |
| 2004/0117179 A1* | 6/2004 | Balasuriya ................. 704/231 |
| 2004/0117804 A1* | 6/2004 | Scahill et al. ............... 719/320 |
| 2004/0122674 A1 | 6/2004 | Bangalore et al. .......... 704/276 |
| 2004/0140989 A1* | 7/2004 | Papageorge ................ 345/700 |
| 2004/0158555 A1 | 8/2004 | Seedman et al. ............ 707/3 |
| 2004/0166832 A1 | 8/2004 | Portman et al. ............ 455/412.1 |
| 2004/0167771 A1 | 8/2004 | Duan et al. ................. 704/10 |
| 2004/0172258 A1 | 9/2004 | Dominach et al. ......... 704/277 |
| 2004/0193408 A1 | 9/2004 | Hunt ......................... 704/209 |
| 2004/0193420 A1 | 9/2004 | Kennewick et al. ........ 704/257 |
| 2004/0199375 A1 | 10/2004 | Ehsani et al. ............... 704/4 |
| 2004/0205671 A1 | 10/2004 | Sukehiro et al. ............ 715/532 |
| 2004/0243417 A9 | 12/2004 | Pitts, III et al. ............ 704/276 |
| 2005/0015256 A1 | 1/2005 | Kargman ................... 704/272 |
| 2005/0021331 A1 | 1/2005 | Huang et al. ............... 704/231 |
| 2005/0021334 A1 | 1/2005 | Iwahashi ................... 704/240 |
| 2005/0021470 A1 | 1/2005 | Martin et al. ............... 705/51 |
| 2005/0021826 A1 | 1/2005 | Kumar ...................... 709/232 |
| 2005/0033574 A1 | 2/2005 | Kim et al. .................. 704/251 |
| 2005/0033582 A1 | 2/2005 | Gadd et al. ................. 704/277 |
| 2005/0043940 A1 | 2/2005 | Elder ........................ 704/9 |
| 2005/0080632 A1 | 4/2005 | Endo et al. ................. 704/277 |
| 2005/0114116 A1 | 5/2005 | Fiedler ...................... 704/201 |
| 2005/0125232 A1* | 6/2005 | Gadd ........................ 704/270.1 |
| 2005/0131673 A1 | 6/2005 | Koizumi et al. ............ 704/2 |
| 2005/0137850 A1 | 6/2005 | Odell ........................ 704/4 |
| 2005/0137877 A1 | 6/2005 | Oesterling et al. .......... 704/275 |
| 2005/0143994 A1 | 6/2005 | Mori et al. ................. 704/235 |
| 2005/0144013 A1 | 6/2005 | Fujimoto et al. ........... 704/277 |
| 2005/0216254 A1 | 9/2005 | Gupta et al. ................ 704/9 |
| 2005/0234727 A1* | 10/2005 | Chiu ......................... 704/270.1 |
| 2005/0246174 A1 | 11/2005 | DeGolia .................... 704/270 |
| 2005/0283752 A1* | 12/2005 | Fruchter et al. ............. 717/100 |
| 2006/0041431 A1* | 2/2006 | Maes ......................... 704/270.1 |
| 2006/0047509 A1 | 3/2006 | Ding et al. ................. 704/231 |
| 2006/0072738 A1 | 4/2006 | Louis et al. ................. 379/265.02 |
| 2006/0074671 A1 | 4/2006 | Farmaner et al. ........... 704/257 |
| 2006/0206310 A1 | 9/2006 | Ravikumar et al. ........ 704/9 |
| 2006/0217133 A1* | 9/2006 | Christenson et al. ....... 455/461 |
| 2006/0285662 A1* | 12/2006 | Yin et al. .................... 379/88.16 |
| 2007/0033005 A1 | 2/2007 | Cristo et al. ................ 704/9 |
| 2007/0033020 A1 | 2/2007 | (Kelleher) Francois et al. ......................... 704/226 |
| 2007/0038436 A1 | 2/2007 | Cristo et al. ................ 704/9 |
| 2007/0038445 A1 | 2/2007 | Helbing et al. ............. 704/235 |
| 2007/0043569 A1 | 2/2007 | Potter et al. ................ 704/270 |
| 2007/0043574 A1* | 2/2007 | Coffman et al. ............ 704/275 |
| 2007/0043868 A1 | 2/2007 | Kumar et al. ............... 709/226 |
| 2007/0050191 A1 | 3/2007 | Weider et al. .............. 704/275 |
| 2007/0055525 A1 | 3/2007 | Kennewick et al. ........ 704/257 |
| 2007/0061067 A1 | 3/2007 | Zeinstra et al. ............. 701/200 |
| 2007/0061735 A1 | 3/2007 | Hoffberg et al. ........... 715/744 |
| 2007/0073544 A1 | 3/2007 | Millett et al. ............... 704/277 |
| 2007/0078708 A1 | 4/2007 | Yu et al. .................... 705/14 |
| 2007/0078709 A1 | 4/2007 | Rajaram .................... 705/14 |
| 2007/0094003 A1 | 4/2007 | Huang et al. ............... 704/3 |
| 2007/0118357 A1 | 5/2007 | Kasravi et al. .............. 704/10 |
| 2007/0135101 A1* | 6/2007 | Ramati et al. .............. 455/414.1 |
| 2007/0146833 A1 | 6/2007 | Satomi et al. .............. 358/537 |
| 2007/0162296 A1 | 7/2007 | Altberg et al. ............. 705/1 |
| 2007/0179778 A1 | 8/2007 | Gong et al. ................. 704/9 |
| 2007/0186165 A1 | 8/2007 | Maislos et al. ............. 715/728 |
| 2007/0198267 A1 | 8/2007 | Jones et al. ................. 704/257 |
| 2007/0203736 A1 | 8/2007 | Ashton ...................... 705/1 |
| 2007/0214182 A1 | 9/2007 | Rosenberg ................. 707/104.1 |
| 2007/0250901 A1 | 10/2007 | McIntire et al. ............ 725/146 |
| 2007/0265850 A1 | 11/2007 | Kennewick et al. ........ 704/257 |
| 2007/0299824 A1 | 12/2007 | Pan et al. ................... 707/3 |
| 2008/0034032 A1* | 2/2008 | Healey et al. .............. 709/203 |
| 2008/0065386 A1 | 3/2008 | Cross et al. ................ 704/270 |
| 2008/0091406 A1 | 4/2008 | Baldwin et al. ............. 704/4 |
| 2008/0103761 A1 | 5/2008 | Printz et al. ................. 704/9 |
| 2008/0109285 A1 | 5/2008 | Reuther et al. ............. 705/7 |
| 2008/0115163 A1 | 5/2008 | Gilboa et al. ............... 725/34 |
| 2008/0133215 A1 | 6/2008 | Sarukkai .................... 704/2 |
| 2008/0140385 A1 | 6/2008 | Mahajan et al. ............ 704/9 |
| 2008/0147396 A1 | 6/2008 | Wang ........................ 704/246 |
| 2008/0147410 A1 | 6/2008 | Odinak ...................... 704/270.1 |
| 2008/0154604 A1 | 6/2008 | Sathish et al. .............. 704/257 |
| 2008/0162471 A1 | 7/2008 | Bernard ..................... 707/5 |
| 2008/0177530 A1 | 7/2008 | Cross et al. ................ 704/4 |
| 2008/0189110 A1 | 8/2008 | Freeman et al. ............ 704/251 |
| 2008/0235023 A1 | 9/2008 | Kennewick et al. ........ 704/257 |
| 2008/0235027 A1 | 9/2008 | Cross ........................ 704/270.1 |
| 2008/0319751 A1 | 12/2008 | Kennewick et al. ........ 704/257 |
| 2009/0052635 A1 | 2/2009 | Jones et al. ................. 379/88.02 |
| 2009/0067599 A1 | 3/2009 | Agarwal et al. ............ 379/114.21 |
| 2009/0076827 A1* | 3/2009 | Bulitta et al. ............... 704/275 |
| 2009/0106029 A1 | 4/2009 | DeLine et al. .............. 704/275 |
| 2009/0117885 A1 | 5/2009 | Roth ......................... 455/414.3 |
| 2009/0144271 A1 | 6/2009 | Richardson et al. ........ 707/5 |
| 2009/0150156 A1 | 6/2009 | Kennewick et al. ........ 704/257 |

(56) References Cited

U.S. PATENT DOCUMENTS

| | | | |
|---|---|---|---|
| 2009/0171664 A1 | 7/2009 | Kennewick et al. | 704/257 |
| 2009/0216540 A1 | 8/2009 | Tessel et al. | 704/275 |
| 2009/0259646 A1 | 10/2009 | Fujita et al. | 707/5 |
| 2009/0271194 A1 | 10/2009 | Davis et al. | 704/235 |
| 2009/0273563 A1 | 11/2009 | Pryor | 345/157 |
| 2009/0276700 A1 | 11/2009 | Anderson et al. | 715/700 |
| 2009/0299745 A1 | 12/2009 | Kennewick et al. | 704/257 |
| 2009/0307031 A1 | 12/2009 | Winkler et al. | 705/7 |
| 2009/0313026 A1* | 12/2009 | Coffman et al. | 704/275 |
| 2010/0023320 A1 | 1/2010 | Di Cristo et al. | 704/9 |
| 2010/0029261 A1 | 2/2010 | Mikkelsen et al. | 455/419 |
| 2010/0036967 A1 | 2/2010 | Caine et al. | 709/236 |
| 2010/0049501 A1 | 2/2010 | Kennewick et al. | 704/9 |
| 2010/0049514 A1 | 2/2010 | Kennewick et al. | 704/233 |
| 2010/0057443 A1 | 3/2010 | Di Cristo et al. | 704/9 |
| 2010/0063880 A1 | 3/2010 | Atsmon et al. | 705/14.53 |
| 2010/0094707 A1 | 4/2010 | Freer | 705/14.54 |
| 2010/0145700 A1 | 6/2010 | Kennewick et al. | 704/257 |
| 2010/0185512 A1 | 7/2010 | Borger et al. | 705/14.49 |
| 2010/0204986 A1 | 8/2010 | Kennewick et al. | 704/226 |
| 2010/0204994 A1 | 8/2010 | Kennewick et al. | 704/257 |
| 2010/0217604 A1* | 8/2010 | Baldwin et al. | 704/275 |
| 2010/0286985 A1 | 11/2010 | Kennewick et al. | 704/257 |
| 2010/0299142 A1 | 11/2010 | Freeman et al. | 704/9 |
| 2010/0312566 A1 | 12/2010 | Odinak et al. | 704/275 |
| 2011/0022393 A1 | 1/2011 | W ller et al. | 704/270 |
| 2011/0112921 A1 | 5/2011 | Kennewick et al. | 705/26.1 |
| 2011/0131036 A1 | 6/2011 | Dicristo et al. | 704/9 |
| 2011/0131045 A1 | 6/2011 | Cristo et al. | 704/249 |
| 2011/0231182 A1 | 9/2011 | Weider et al. | 704/9 |
| 2011/0231188 A1 | 9/2011 | Kennewick et al. | 704/236 |
| 2012/0022857 A1 | 1/2012 | Baldwin et al. | 704/9 |
| 2012/0101809 A1 | 4/2012 | Kennewick et al. | 704/9 |
| 2012/0101810 A1 | 4/2012 | Kennewick et al. | 704/9 |
| 2012/0109753 A1 | 5/2012 | Kennewick et al. | 705/14.58 |
| 2012/0150636 A1 | 6/2012 | Freeman et al. | 705/14.49 |
| 2012/0278073 A1 | 11/2012 | Weider et al. | 704/235 |
| 2013/0054228 A1 | 2/2013 | Baldwin et al. | 704/9 |
| 2013/0080177 A1 | 3/2013 | Chen | 704/275 |
| 2013/0211710 A1 | 8/2013 | Kennewick, et aL | 701/419 |
| 2013/0253929 A1 | 9/2013 | Weider et al. | 704/235 |
| 2013/0297293 A1 | 11/2013 | Di Cristo et al. | 704/9 |
| 2013/0304473 A1 | 11/2013 | Baldwin et al. | 704/257 |
| 2013/0339022 A1 | 12/2013 | Baldwin et al. | 704/257 |
| 2014/0012577 A1 | 1/2014 | Freeman et al. | 704/249 |
| 2014/0108013 A1 | 4/2014 | Di Cristo et al. | 704/254 |
| 2014/0156278 A1 | 6/2014 | Kennewick et al. | 704/254 |
| 2014/0249821 A1 | 9/2014 | Kennewick et al. | 704/257 |
| 2014/0249822 A1 | 9/2014 | Baldwin et al. | 704/257 |
| 2014/0288934 A1 | 9/2014 | Kennewick et al. | 704/257 |
| 2014/0365222 A1 | 12/2014 | Weider et al. | 704/257 |
| 2015/0019217 A1 | 1/2015 | Di Cristo et al. | 704/235 |
| 2015/0066627 A1 | 3/2015 | Freeman et al. | 705/14.41 |
| 2015/0073910 A1 | 3/2015 | Kennewick et al. | 705/14.58 |
| 2015/0095159 A1 | 4/2015 | Kennewick et al. | 705/14.58 |

FOREIGN PATENT DOCUMENTS

| | | |
|---|---|---|
| JP | 2006-146881 | 6/2006 |
| JP | 2008-027454 | 2/2008 |
| JP | 2008-139928 | 6/2008 |
| JP | 2011-504304 | 2/2011 |
| WO | WO 99/46763 | 9/1999 |
| WO | WO 00/21232 | 4/2000 |
| WO | WO 00/46792 | 8/2000 |
| WO | WO 01/78065 | 10/2001 |
| WO | WO 2004/072954 | 8/2004 |
| WO | WO 2007/019318 | 2/2007 |
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | WO 2009/145796 | 12/2009 |
| WO | WO 2010/096752 | 8/2010 |

OTHER PUBLICATIONS

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media", *IEEE Aerosp. Electron. Systems Magazine*, vol. 14, No. 9, Sep. 1999, pp. 27-32.

Zhao, Yilin, "Telematics: Safe and Fun Driving", *IEEE Intelligent Systems*, vol. 17, Issue 1, 2002, pp. 10-14.

Chai et al., "Mind: A Semantics-Based Multimodal Interpretation Framework for Conversational System", *Proceedings of the International CLASS Workshop on Natural, Intelligent and Effective Interaction in Multimodal Dialogue Systems*, Jun. 2002, pp. 37-46.

Cheyer et al., "Multimodal Maps: An Agent-Based Approach", *International Conference on Cooperative Multimodal Communication* (CMC/95), May 24-26, 1995, pp. 111-121.

Elio et al., "On Abstract Task Models and Conversation Policies" in Workshop on Specifying and Implementing Conversation Policies, *Autonomous Agents '99*, Seattle, 1999, 10 pages.

Turunen, "Adaptive Interaction Methods in Speech User Interfaces", Conference on Human Factors in Computing Systems, Seattle, Washington, 2001, pp. 91-92.

Mao, Mark Z., "Automatic Training Set Segmentation for Multi-Pass Speech Recognition", Department of Electrical Engineering, Stanford University, CA, copyright 2005, IEEE, pp. I-685 to I-688.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al.,"Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.

O'Shaughnessy, Douglas, "Interacting with Computers by Voice: Automatic Speech Recognition and Synthesis", *Proceedings of the IEEE*, vol. 91, No. 9, Sep. 1, 2003, 1272-1305.

Statement in Accordance with the Notice from the European Patent Office dated Oct. 1, 2007 Concerning Business Methods (OJ EPO Nov. 2007, 592-593), XP002456252.

\* cited by examiner

SYSTEM AND METHOD FOR HYBRID PROCESSING IN A NATURAL LANGUAGE VOICE SERVICES ENVIRONMENT

CROSS-REFERENCE TO RELATED APPLICATIONS

This application claims the benefit of U.S. Provisional Patent Application Ser. No. 61/259,827, entitled "System and Method for Hybrid Processing in a Natural Language Voice Services Environment," filed Nov. 10, 2009, the contents of which are hereby incorporated by reference in their entirety.

FIELD OF THE INVENTION

The invention relates to hybrid processing in a natural language voice services environment that includes a plurality of multi-modal devices, wherein hybrid processing in the natural language voice services environment may include the plurality of multi-modal devices cooperatively interpreting and processing one or more natural language utterances included in one or more multi-modal requests.

BACKGROUND OF THE INVENTION

As technology has progressed in recent years, consumer electronic devices have emerged to become nearly ubiquitous in the everyday lives of many people. To meet the increasing demand that has resulted from growth in the functionality and mobility of mobile phones, navigation devices, embedded devices, and other such devices, many devices offer a wealth of features and functions in addition to core applications. Greater functionality also introduces trade-offs, however, including learning curves that often inhibit users from fully exploiting all of the capabilities of their electronic devices. For example, many existing electronic devices include complex human to machine interfaces that may not be particularly user-friendly, which can inhibit mass-market adoption for many technologies. Moreover, cumbersome interfaces often result in otherwise desirable features being difficult to find or use (e.g., because of menus that are complex or otherwise tedious to navigate). As such, many users tend not to use, or even know about, many of the potential capabilities of their devices.

As such, the increased functionality of electronic devices often tends to be wasted, as market research suggests that many users only use only a fraction of the features or applications available on a given device. Moreover, in a society where wireless networking and broadband access are increasingly prevalent, consumers tend to naturally desire seamless mobile capabilities from their electronic devices. Thus, as consumer demand intensifies for simpler mechanisms to interact with electronic devices, cumbersome interfaces that prevent quick and focused interaction become an important concern. Nevertheless, the ever-growing demand for mechanisms to use technology in intuitive ways remains largely unfulfilled.

One approach towards simplifying human to machine interactions in electronic devices has included the use of voice recognition software, which has the potential to enable users to exploit features that would otherwise be unfamiliar, unknown, or difficult to use. For example, a recent survey conducted by the Navteq Corporation, which provides data used in a variety of applications such as automotive navigation and web-based applications, demonstrates that voice recognition often ranks among the features most desired by consumers of electronic devices. Even so, existing voice user interfaces, when they actually work, still require significant learning on the part of the user.

For example, many existing voice user interface only support requests formulated according to specific command-and-control sequences or syntaxes. Furthermore, many existing voice user interfaces cause user frustration or dissatisfaction because of inaccurate speech recognition. Similarly, by forcing a user to provide pre-established commands or keywords to communicate requests in ways that a system can understand, existing voice user interfaces do not effectively engage the user in a productive, cooperative dialogue to resolve requests and advance a conversation towards a satisfactory goal (e.g., when users may be uncertain of particular needs, available information, device capabilities, etc.). As such, existing voice user interfaces tend to suffer from various drawbacks, including significant limitations on engaging users in a dialogue in a cooperative and conversational manner.

Additionally, many existing voice user interfaces fall short in utilizing information distributed across different domains, devices, and applications in order to resolve natural language voice-based inputs. Thus, existing voice user interfaces suffer from being constrained to a finite set of applications for which they have been designed, or to devices on which they reside. Although technological advancement has resulted in users often having several devices to suit their various needs, existing voice user interfaces do not adequately free users from device constraints. For example, users may be interested in services associated with different applications and devices, but existing voice user interfaces tend to restrict users from accessing the applications and devices as they see fit. Moreover, users typically can only practicably carry a finite number of devices at any given time, yet content or services associated with users' devices other than those currently being used may be desired in various circumstances.

Accordingly, although users tend to have varying needs, where content or services associated with different devices may be desired in various contexts or environments, existing voice technologies tend to fall short in providing an integrated environment in which users can request content or services associated with virtually any device or network. As such, constraints on information availability and device interaction mechanisms in existing voice services environments tend to prevent users from experiencing technology in an intuitive, natural, and efficient way. For instance, when a user wishes to perform a given function using a given electronic device, but does not necessarily know how to go about performing the function, the user typically cannot engage in cooperative multi-modal interactions with the device to simply utter words in natural language to request the function.

Furthermore, relatively simple functions can often be tedious to perform using electronic devices that do not have voice recognition capabilities. For example, purchasing new ring-tones for a mobile phone tends to be a relatively straight-forward process, but users must typically navigate several menus and press many different buttons in order to complete the process. As such, it becomes apparent that interaction with electronic devices could be far more efficient if users were able to use natural language to exploit buried or otherwise difficult to use functionality. Existing systems suffer from these and other problems.

SUMMARY OF THE INVENTION

According to one aspect of the invention, a system and method for hybrid processing in a natural language voice services environment may address one or more of the aforementioned problems with existing systems. In particular, hybrid processing in the natural language voice services environment may generally include a plurality of multi-modal devices cooperatively interpreting and processing one or more natural language utterances included in one or more multi-modal requests, as described in further detail herein.

According to one aspect of the invention, hybrid processing in the natural language voice services environment may generally include a plurality of multi-modal devices cooperatively interpreting and processing one or more natural language utterances included in one or more multi-modal requests. For example, a virtual router may receive various messages that include encoded audio corresponding to a natural language utterance contained in a multi-modal interaction provided to one or more of the devices. The virtual router may then analyze the encoded audio to select a cleanest sample of the natural language utterance and communicate with one or more other devices in the environment to determine an intent of the multi-modal interaction. The virtual router may then coordinate resolving the multi-modal interaction based on the intent of the multi-modal interaction.

According to one aspect of the invention, a method for hybrid processing in a natural language voice services environment may comprise detecting at least one multi-modal interaction at an electronic device, wherein the multi-modal interaction includes at least a natural language utterance. One or more messages containing information relating to the multi-modal interaction may then be communicated to a virtual router in communication with the electronic device, wherein the electronic device communicates the one or more messages to the virtual router through a messaging interface. The method may further comprise receiving one or more messages containing information relating to an intent of the multi-modal interaction at the electronic device through the messaging interface. As such, the multi-modal interaction may be resolved at the electronic device based on the information contained in the one or more messages received from the virtual router.

According to one aspect of the invention, a method for hybrid processing in a natural language voice services environment may comprise one or more electronic devices in communication with the virtual router. In particular, the electronic device may be configured to detect at least one multi-modal interaction that includes at least a natural language utterance and communicate one or more messages containing information relating to the multi-modal interaction to the virtual router through a messaging interface. The electronic device may then receive one or more messages containing information relating to an intent of the multi-modal interaction from the virtual router through the messaging interface and resolve the multi-modal interaction at the electronic device based on the information contained in the one or more messages received from the virtual router.

Other objects and advantages of the invention will be apparent based on the following drawings and detailed description.

DETAILED DESCRIPTION

Figure 1:
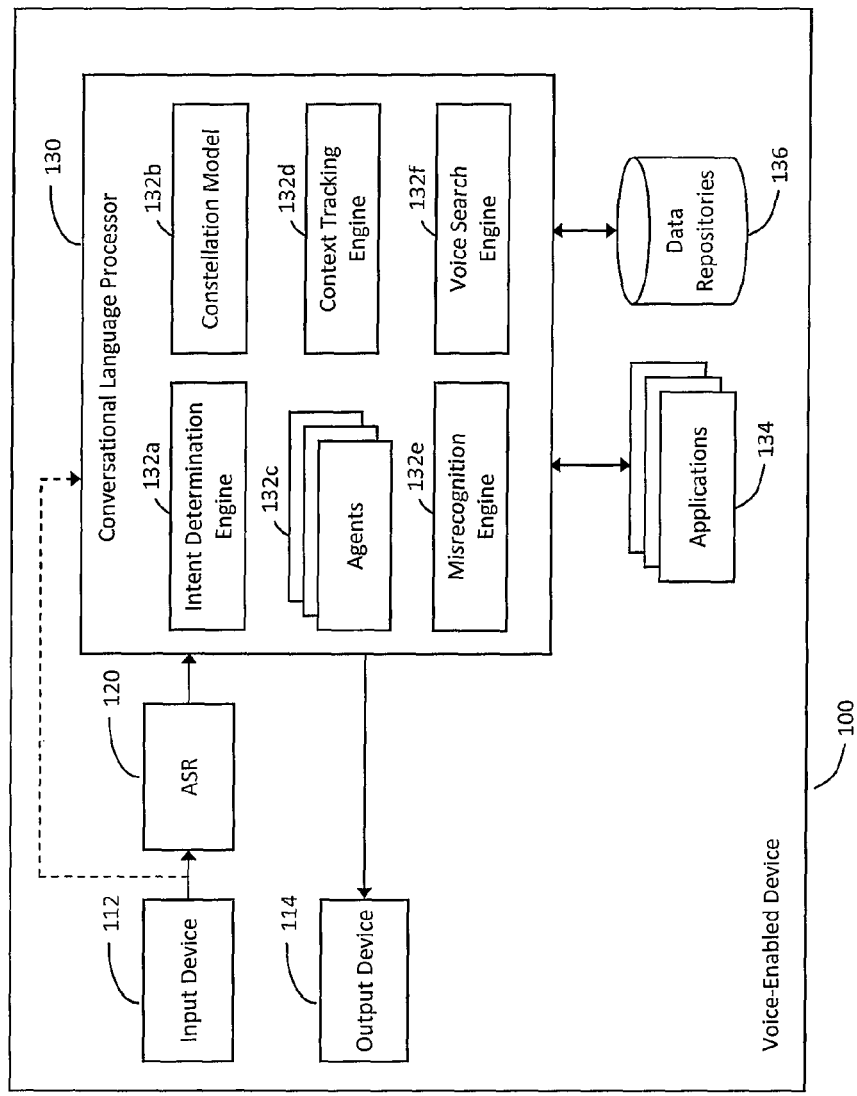
FIG. 1 illustrates a block diagram of an exemplary voice-enabled device that can be used for hybrid processing in a natural language voice services environment, according to one aspect of the invention.

According to one aspect of the invention, FIG. 1 illustrates a block diagram of an exemplary voice-enabled device 100 that can be used for hybrid processing in a natural language voice services environment. As will be apparent from the further description to be provided herein, the voice-enabled device 100 illustrated in FIG. 1 may generally include an input device 112, or a combination of input devices 112, which may enable a user to interact with the voice-enabled device 100 in a multi-modal manner. In particular, the input devices 112 may generally include any suitable combination of at least one voice input device 112 (e.g., a microphone) and at least one non-voice input device 112 (e.g., a mouse, touch-screen display, wheel selector, etc.). As such, the input devices 112 may include any suitable combination of electronic devices having mechanisms for receiving both voice-based and non-voice-based inputs (e.g., a microphone coupled to one or more of a telematics device, personal navigation device, mobile phone, VoIP node, personal computer, media device, embedded device, server, or other electronic device).

In one implementation, the voice-enabled device 100 may enable the user to engage in various multi-modal conversational interactions, which the voice-enabled device 100 may process in a free-form and cooperative manner to execute various tasks, resolve various queries, or otherwise resolve various natural language requests included in the multi-modal interactions. For example, in one implementation, the voice-enabled device 100 may include various natural language processing components, including at least a voice-click module coupled to the one or more input devices 112, as described in further detail in co-pending U.S. patent application Ser. No. 12/389,678, entitled "System and Method for Processing Multi-Modal Device Interactions in a Natural Language Voice Services Environment," filed Feb. 20, 2009, the contents of which are hereby incorporated by reference in their entirety. Thus, as will be described in further detail herein, the one or more input devices 112 and the voice-click module may be collectively configured to process various multi-modal interactions between the user and the voice-enabled device 100.

For example, in one implementation, the multi-modal interactions may include at least one natural language utterance, wherein the natural language utterance may be converted into an electronic signal. The electronic signal may then be provided to an Automatic Speech Recognizer (ASR) 120, which may also be referred to as a speech recognition engine 120 and/or a multi-pass speech recognition engine 120. In response to receiving the electronic signal corresponding to the utterance, the ASR 120 may generate one or more preliminary interpretations of the utterance and provide the preliminary interpretation to a conversational language processor 130. Additionally, in one implementation, the multi-modal interactions may include one or more non-voice interactions with the one or more input devices 112 (e.g., button pushes, multi-touch gestures, point of focus or attention focus selections, etc.). As such, the voice-click module may extract context from the non-voice interactions and provide the context to the conversational language processor 130 for use in generating an interpretation of the utterance (i.e., via the dashed line illustrated in FIG. 1). As such, as described in greater detail below, the conversational language processor 130 may analyze the utterance and any accompanying non-voice interactions to determine an intent of the multi-modal interactions with the voice-enabled device 100.

In one implementation, as noted above, the voice-enabled device 100 may include various natural language processing components that can support free-form utterances and/or other forms of non-voice device interactions, which may liberate the user from restrictions relating to the manner of formulating commands, queries, or other requests. As such, the user may provide the utterance to the voice input device 112 using any manner of speaking, and may further provide other non-voice interactions to the non-voice input device 112 to request any content or service available through the voice-enabled device 100. For instance, in one implementation, in response to receiving the utterance at the voice input device 112, the utterance may be processed using techniques described in U.S. patent application Ser. No. 10/452,147, entitled "Systems and Methods for Responding to Natural Language Speech Utterance," which issued as U.S. Pat. No. 7,398,209 on Jul. 8, 2008, and co-pending U.S. patent application Ser. No. 10/618,633, entitled "Mobile Systems and Methods for Responding to Natural Language Speech Utterance," filed Jun. 15, 2003, the contents of which are hereby incorporated by reference in their entirety. In addition, the user may interact with one or more of the non-voice input devices 112 to provide buttons pushes, multi-touch gestures, point of focus or attention focus selections, or other non-voice device interactions, which may provide further context or other information relating to the natural language utterances and/or the requested content or service.

In one implementation, the voice-enabled device 100 may be coupled to one or more additional systems that may be configured to cooperate with the voice-enabled device 100 to interpret or otherwise process the multi-modal interactions that include combinations of natural language utterances and/or non-voice device interactions. For example, as will be described in greater detail below in connection with FIG. 2, the one or more additional systems may include one or more multi-modal voice-enabled devices having similar natural language processing capabilities to the voice-enabled device 100, one or more non-voice devices having data retrieval and/or task execution capabilities, and a virtual router that coordinates interaction among the voice-enabled device 100 and the additional systems. As such, the voice-enabled device 100 may include an interface to an integrated natural language voice services environment that includes a plurality of multi-modal devices, wherein the user may request content or services available through any of the multi-modal devices.

For example, in one implementation, the conversational language processor 130 may include a constellation model 132b that provides knowledge relating to content, services, applications, intent determination capabilities, and other features available in the voice services environment, as described in co-pending U.S. patent application Ser. No. 12/127,343, entitled "System and Method for an Integrated, Multi-Modal, Multi-Device Natural Language Voice Services Environment," filed May 27, 2008, the contents of which are hereby incorporated by reference in their entirety. As such, the voice-enabled device 100 may have access to shared knowledge relating to natural language processing capabilities, context, prior interactions, domain knowledge, short-term knowledge, long-term knowledge, and cognitive models for the various systems and multi-modal devices, providing a cooperative environment for resolving the multi-modal interactions received at the voice-enabled device 100.

In one implementation, the input devices 112 and the voice-click module coupled thereto may be configured to continually monitor for one or more multi-modal interactions received at the voice-enabled device 100. In particular, the input devices 112 and the voice-click module may continually monitor for one or more natural language utterances and/or one or more distinguishable non-voice device interactions, which may collectively provide the relevant context for retrieving content, executing tasks, invoking services or commands, or processing any other suitable requests. Thus, in response to detecting one or more multi-modal interactions, the input devices 112 and/or the voice-click module may signal the voice-enabled device 100 that an utterance and/or a non-voice interaction have been received. For example, in one implementation, the non-voice interaction may provide context for sharpening recognition, interpretation, and understanding of an accompanying utterance, and moreover, the utterance may provide further context for enhancing interpretation of the accompanying non-voice interaction. Accordingly, the utterance and the non-voice interaction may collectively provide relevant context that various natural language processing components may use to determine an intent of the multi-modal interaction that includes the utterance and the non-voice interaction.

In one implementation, as noted above, processing the utterance included in the multi-modal interaction may be initiated at the ASR 120, wherein the ASR 120 may generate one or more preliminary interpretations of the utterance. In one implementation, to generate the preliminary interpretations of the utterance, the ASR 120 may be configured to recognize one or more syllables, words, phrases, or other acoustic characteristics from the utterance using one or more dynamic recognition grammars and/or acoustic models. For example, in one implementation, the ASR 120 may use the dynamic recognition grammars and/or the acoustic models to recognize a stream of phonemes from the utterance based on phonetic dictation techniques, as described in U.S. patent application Ser. No. 11/513,269, entitled "Dynamic Speech Sharpening," which issued as U.S. Pat. No. 7,634,409 on Dec. 15, 2009, the contents of which are hereby incorporated by reference in their entirety. In addition, the dynamic recognition grammars and/or the acoustic models may include unstressed central vowels (e.g., "schwa"), which may reduce a search space for recognizing the stream of phonemes for the utterance.

Furthermore, in one implementation, the ASR 120 may be configured as a multi-pass speech recognition engine 120, as described in U.S. patent application Ser. No. 11/197,504, entitled "Systems and Methods for Responding to Natural Language Speech Utterance," which issued as U.S. Pat. No. 7,640,160 on Dec. 29, 2009, the contents of which are hereby incorporated by reference in their entirety. The multi-pass speech recognition 120 may be configured to initially invoke a primary speech recognition engine to generate a first transcription of the utterance, and further to optionally subsequently invoke one or more secondary speech recognition engines to generate one or more secondary transcriptions of the utterance. In one implementation, the first transcription may be generated using a large list dictation grammar, while the secondary transcriptions may be generated using virtual dictation grammars having decoy words for out-of-vocabulary words, reduced vocabularies derived from a conversation history, or other dynamic recognition grammars. For example, in one implementation, if a confidence level for the first transcription does not meet or exceed a threshold, the secondary speech recognition engines may be invoked to sharpen the interpretation of the primary speech recognition engine. It will be apparent, however, that the multi-pass speech recognition engine 120 may interpret the utterance using any suitable combination of techniques that results in a preliminary interpretation derived from a plurality of transcription passes for the utterance (e.g., the secondary speech recognition engines may be invoked regardless of the confidence level for the first transcription, or the primary speech recognition engine and/or the secondary speech recognition engines may employ recognition grammars that are identical or optimized for a particular interpretation context, etc.).

Accordingly, in one implementation, the dynamic recognition grammars used in the ASR 120 may be optimized for different languages, contexts, domains, memory constraints, and/or other suitable criteria. For example, in one implementation, the voice-enabled device 100 may include one or more applications 134 that provide content or services for a particular context or domain, such as a navigation application 134. As such, in response to the ASR 120 determining navigation as the most likely context for the utterance, the dynamic recognition grammars may be optimized for various physical, temporal, directional, or other geographical characteristics (e.g., as described in co-pending U.S. patent application Ser. No. 11/954,064, entitled "System and Method for Providing a Natural Language Voice User. Interface in an Integrated Voice Navigation Services Environment," filed Dec. 11, 2007, the contents of which are hereby incorporated by reference in their entirety). In another example, an utterance containing the word "traffic" may be subject to different interpretations depending on whether the user intended a navigation context (i.e., traffic on roads), a music context (i.e., the 1960's rock band), or a movie context (i.e., the Steven Soderbergh film). Accordingly, the recognition grammars used in the ASR 120 may be dynamically adapted to optimize accurate recognition for any given utterance (e.g., in response to incorrectly interpreting an utterance to contain a particular word or phrase, the incorrect interpretation may be removed from the recognition grammar to prevent repeating the incorrect interpretation).

In one implementation, in response to the ASR 120 generating the preliminary interpretations of the utterance included in the multi-modal interaction using one or more of the techniques described above, the ASR 120 may provide the preliminary interpretations to the conversational language processor 130. The conversational language processor 130 may generally include various natural language processing components, which may be configured to model human-to-human conversations or interactions. Thus, the conversational language processor 130 may invoke one or more of the natural language processing components to further analyze the preliminary interpretations of the utterance and any accompanying non-voice interactions to determine the intent of the multi-modal interactions received at the voice-enabled device 100.

In one implementation, the conversational language processor 120 may invoke an intent determination engine 130a configured to determine the intent of the multi-modal interactions received at the voice-enabled device 100. In one implementation, the intent determination engine 130a may invoke a knowledge-enhanced speech recognition engine that provides long-term and short-term semantic knowledge for determining the intent, as described in co-pending U.S. patent application Ser. No. 11/212,693, entitled "Mobile Systems and Methods of Supporting Natural Language Human-Machine Interactions," filed Aug. 29, 2005, the contents of which are hereby incorporated by reference in their entirety. For example, in one implementation, the semantic knowledge may be based on a personalized cognitive model derived from one or more prior interactions with the user, a general cognitive model derived from one or more prior interactions with various different users, and/or an environmental cognitive model derived from an environment associated with the user, the voice-enabled device 100, and/or the voice services environment (e.g., ambient noise characteristics, location sensitive information, etc.).

Furthermore, the intent determination engine 132a may invoke a context tracking engine 132d to determine the context for the multi-modal interactions. For example, any context derived from the natural language utterance and/or the non-voice interactions in the multi-modal interactions may be pushed to a context stack associated with the context tracking engine 132d, wherein the context stack may include various entries that may be weighted or otherwise ranked according to one or more contexts identified from the cognitive models and the context for the current multi-modal interactions. As such, the context tracking engine 132d may determine one or more entries in the context stack that match information associated with the current multi-modal interactions to, determine a most likely context for the current multi-modal interactions. The context tracking engine 132d may then provide the most likely context to the intent determination engine 132a, which may determine the intent of the multi-modal interactions in view of the most likely context.

In addition, based on the most likely context, the intent determination engine 132a may reference the constellation model 132b to determine whether to invoke any of the various systems or multi-modal devices in the voice services environment. For example, as noted above, the constellation model 132b may provide intent determination capabilities, domain knowledge, semantic knowledge, cognitive models, and other information available through the various systems and multi-modal devices. As such, the intent determination engine 132a may reference the constellation model 132b to determine whether one or more of the other systems and/or multi-modal devices should be engaged to participate in determining the intent of the multi-modal interactions. For example, in response to the constellation model 132b indicating that one or more of the other systems and/or multi-modal devices have natural language processing capabilities optimized for the most likely context, the intent determination engine 132a may forward information relating to the multi-modal interactions to such systems and/or multi-modal devices, which may then determine the intent of the multi-modal interactions and return the intent determination to the voice-enabled device 100.

In one implementation, the conversational language processor 130 may be configured to engage the user in one or more cooperative conversations to resolve the intent or otherwise process the multi-modal interactions, as described in co-pending U.S. patent application Ser. No. 11/580,926, entitled "System and Method for a Cooperative Conversational Voice User Interface," filed Oct. 16, 2006, the contents of which are hereby incorporated by reference in their entirety. In particular, the conversational language processor 130 may generally identify a conversational goal for the multi-modal interactions, wherein the conversational goal may be identifying from analyzing the utterance, the non-voice interactions, the most likely context, and/or the determined intent. As such, the conversational goal identified for the multi-modal interactions may generally control the cooperative conversation between the conversational language processor 130 and the user. For example, the conversational language processor 130 may generally engage the user in one or more query conversations, didactic conversations, and/or exploratory conversations to resolve or otherwise process the multi-modal interactions.

In particular, the conversational language processor 130 may engage the user in a query conversation in response to identifying that the conversational goal relates to retrieving discrete information or performing a particular function. Thus, in a cooperative query conversation, the user may lead the conversation towards achieving the particular conversational goal, while the conversational language processor 130 may initiate one or more queries, tasks, commands, or other requests to achieve the goal and thereby support the user in the conversation. In response to ambiguity or uncertainty in the intent of the multi-modal interaction, the conversational language processor 130 may engage the user in a didactic conversation to resolve the ambiguity or uncertainty (e.g., where noise or malapropisms interfere with interpreting the utterance, multiple likely contexts cannot be disambiguated, etc.). As such, in a cooperative didactic conversation, the conversational language processor 130 may lead the conversation to clarify the intent of the multi-modal interaction (e.g., generating feedback provided through an output device 114), while the user may regulate the conversation and provide additional multi-modal interactions to clarify the intent. In, response to determining the intent of the multi-modal interactions with suitable confidence, with the intent indicating an ambiguous or uncertain goal, the conversational language processor 130 may engage the user in an exploratory conversation to resolve the goal. In a cooperative exploratory conversation, the conversational language processor 130 and the user may share leader and supporter roles, wherein the ambiguous or uncertain goal may be improvised or refined over a course of the conversation.

Thus, the conversational language processor 130 may generally engage in one or more cooperative conversations to determine the intent and resolve a particular goal for the multi-modal interactions received at the voice-enabled device 100. The conversational language processor 130 may then initiate one or more queries, tasks, commands, or other requests in furtherance of the intent and the goal determined for the multi-modal interactions. For example, in one implementation, the conversational language processor 130 may invoke one or more agents 132*c* having capabilities for processing requests in a particular domain or application 134, a voice search engine 132*f* having capabilities for retrieving information requested in the multi-modal interactions (e.g., from one or more data repositories 136, networks, or other information sources coupled to the voice-enabled device 100), or one or more other systems or multi-modal devices having suitable processing capabilities for furthering the intent and the goal for the multi-modal interactions (e.g., as determined from the constellation model 132*b*).

Additionally, in one implementation, the conversational language processor 130 may invoke an advertising application 134 in relation to the queries, tasks, commands, or other requests initiated to process the multi-modal interactions, wherein the advertising application 134 may be configured to select one or more advertisements that may be relevant to the intent and/or the goal for the multi-modal interactions, as described in co-pending U.S. patent application Ser. No. 11/671,526, entitled "System and Method for Selecting and Presenting Advertisements Based on Natural Language Processing of Voice-Based Input," filed Feb. 6, 2007, the contents of which are hereby incorporated by reference in their entirety.

In one implementation, in response to receiving results from any suitable combination of queries, tasks, commands, or other requests processed for the multi-modal interactions, the conversational language processor 130 may format the results for presentation to the user through the output device 114. For example, the results may be formatted into a natural language utterance that can be converted into an electronic signal and provided to the user through a speaker coupled to the output device 114, or the results may be visually presented on a display coupled to the output device 114, or in any other suitable manner (e.g., the results may indicate whether a particular task or command was successfully performed, or the results may include information retrieved in response to one or more queries, or the results may include a request to frame a subsequent multi-modal interaction if the results are ambiguous or otherwise incomplete, etc.).

Furthermore, in one implementation, the conversational language processor 130 may include a misrecognition engine 132*e* configured to determine whether the conversational language processor 130 incorrectly determined the intent for the multi-modal interactions. In one implementation, the misrecognition engine 132*e* may determine that the conversational language processor 130 incorrectly determined the intent in response to one or more subsequent multi-modal interactions provided proximately in time to the prior multi-modal interactions, as described in U.S. patent application Ser. No. 11/200,164, entitled "System and Method of Supporting Adaptive Misrecognition in Conversational Speech," which issued as U.S. Pat. No. 7,620,549 on Nov. 17, 2009, the contents of which are hereby incorporated by reference in their entirety. For example, the misrecognition engine 132*e* may monitor for one or more subsequent multi-modal interactions that include a stop word, override a current request, or otherwise indicate an unrecognized or misrecognized event. The misrecognition engine 132*e* may then determine one or more tuning parameters for various components associated with the ASR 120 and/or the conversational language processor 130 to improve subsequent interpretations.

Accordingly, as described in further detail above, the voice-enabled device 100 may generally include various natural language processing components and capabilities that may be used for hybrid processing in the natural language voice services environment. In particular, the voice-enabled device 100 may be configured to determine the intent for various multi-modal interactions that include any suitable combination of natural language utterances and/or non-voice interactions and process one or more queries, tasks, commands, or other requests based on the determined intent. Furthermore, as noted above and as will be described in greater detail below, one or more other systems and/or multi-modal devices may participate in determining the intent and processing the queries, tasks, commands, or other requests for the multi-modal interactions to provide a hybrid processing methodology, wherein the voice-enabled device 100 and the various other systems and multi-modal devices may each perform partial processing to determine the intent and otherwise process the multi-modal interactions in a cooperative manner. For example, in one implementation, the cooperatively processed multi-modal interactions may include requests to dedicate content (e.g., to a particular person or entity), wherein the multi-modal interactions may be processed using techniques described in U.S. Provisional Patent Application Ser. No. 61/259,820, entitled "System and Method for Providing a Natural Language Content Dedication Service," filed Nov. 10, 2009, the contents of which are hereby incorporated by reference in their entirety.

Figure 2:
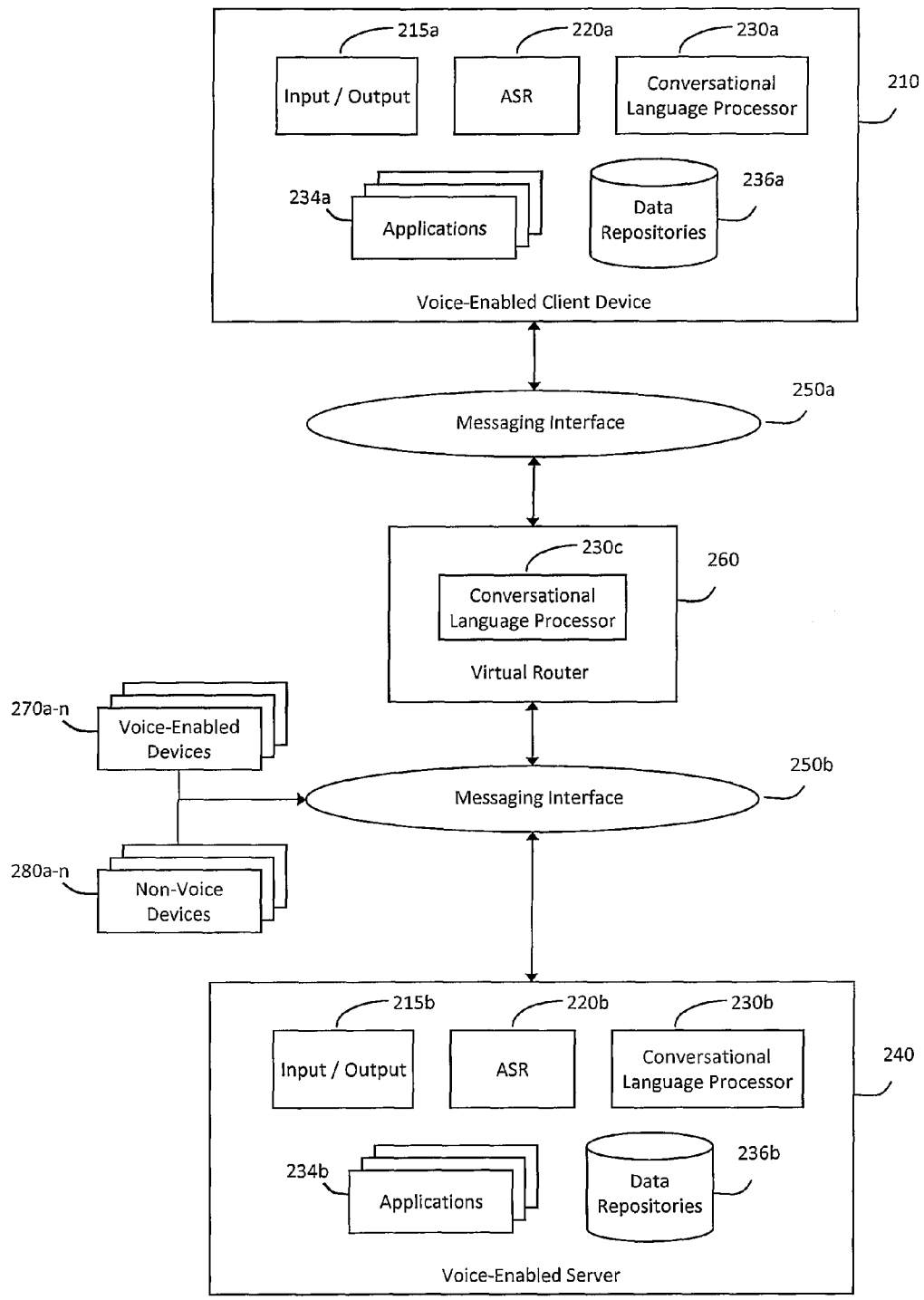
FIG. 2 illustrates a block diagram of an exemplary system for hybrid processing in a natural language voice service environment, according to one aspect of the invention.

According to one aspect of the invention, FIG. 2 illustrates a block diagram of an exemplary system for hybrid processing in a natural language voice service environment. In particular, the system illustrated in FIG. 2 may generally include a voice-enabled client device 210 similar to the voice-enabled device described above in relation to FIG. 1. For example, the voice-enabled client device 210 may include any suitable combination of input and output devices 215a respectively arranged to receive natural language multi-modal interactions and provide responses to the natural language multi-modal interactions. In addition, the voice-enabled client device 210 may include an Automatic Speech Recognizer (ASR) 220a configured to generate one or more preliminary interpretations of natural language utterances received at the input device 215a, and further configured to provide the preliminary interpretations to a conversational language processor 230a.

In one implementation, the conversational language processor 230a on the voice-enabled client device 210 may include one or more natural language processing components, which may be invoked to determine an intent for the multi-modal interactions received at the voice-enabled client device 210. The conversational language processor 230a may then initiate one or more queries, tasks, commands, or other requests to resolve the determined intent. For example, the conversational language processor 230a may invoke one or more applications 234a to process requests in a particular domain, query one or more data repositories 236a to retrieve information requested in the multi-modal interactions, or otherwise engage in one or more cooperative conversations with a user of the voice-enabled client device 210 to resolve the determined intent. Furthermore, as noted above in connection with FIG. 1, the voice-enabled client device 210 may also cooperate with one or more other systems or multi-modal devices having suitable processing capabilities for initiating queries, tasks, commands, or other requests to resolve the intent of the multi-modal interactions.

In particular, to cooperate with the other systems or multi-modal devices in the hybrid processing environment, the voice-enabled client device 210 may use a messaging interface 250a to communicative with a virtual router 260, wherein the messaging interface 250a may generally include a light client (or thin client) that provides a mechanism for the voice-enabled client device 210 to transmit input to and receive output from the virtual router 260. In addition, the virtual router 260 may further include a messaging interface 250b providing a mechanism for communicating with one or more additional voice-enabled devices 270a-n, one or more non-voice devices 280a-n, and a voice-enabled server 240. Furthermore, although FIG. 2 illustrates messaging interface 250a and messaging interface 250b as components that are distinct from the devices to which they are communicatively coupled, it will be apparent that such illustration is for ease of description only, as the messaging interfaces 250a-b may be provided as on-board components that execute on the various devices illustrated in FIG. 2 to facilitate communication among the various devices in the hybrid processing environment.

For example, in one implementation, the messaging interface 250a that executes on the voice-enabled client device 210 may transmit input from the voice-enabled client device 210 to the virtual router 260 within one or more XML messages, wherein the input may include encoded audio corresponding to natural language utterances, preliminary interpretations of the natural language utterances, data corresponding to multi-touch gestures, point of focus or attention focus selections, and/or other multi-modal interactions. In one implementation, the virtual router 260 may then further process the input using a conversational language processor 230c having capabilities for speech recognition, intent determination, adaptive misrecognition, and/or other natural language processing. Furthermore, the conversational language processor 230c may include knowledge relating to content, services, applications, natural language processing capabilities, and other features available through the various devices in the hybrid processing environment.

As such, in one implementation, the virtual router 260 may further communicate with the voice-enabled devices 270, the non-voice devices 280, and/or the voice-enabled server 240 through the messaging interface 250b to coordinate processing for the input received from the voice-enabled client device 210. For example, based on the knowledge relating to the features and capabilities of the various devices in the hybrid processing environment, the virtual router 260 may identify one or more of the devices that have suitable features and/or capabilities for resolving the intent of the input received from the voice-enabled client device 210. The virtual router 260 may then forward one or more components of the input to the identified devices through respective messaging interfaces 250b, wherein the identified devices may be invoked to perform any suitable processing for the components of the input forwarded from the virtual router 260. In one implementation, the identified devices may then return any results of the processing to the virtual router 260 through the respective messaging interfaces 250b, wherein the virtual router 260 may collate the results of the processing and return the results to the voice-enabled client device 210 through the messaging interface 250a.

Accordingly, the virtual router 260 may communicate with any of the devices available in the hybrid processing environment through messaging interfaces 250a-b to coordinate cooperative hybrid processing for multi-modal interactions or other natural language inputs received from the voice-enabled client device 210. For example, in one implementation, the cooperative hybrid processing may be used to enhance performance in embedded processing architectures in which the voice-enabled client device 210 includes a constrained amount of resources (e.g., the voice-enabled client device 210 may be a mobile device having a limited amount of internal memory or other dedicated resources for natural language processing). As such, when the voice-enabled client device 210 has an embedded processing architecture, one or more components of the voice-enabled client device 210 may be configured to optimize efficiency of on-board natural language processing to reduce or eliminate bottlenecks, lengthy response times, or degradations in performance.

For example, in one implementation, optimizing the efficiency of the on-board natural language processing may include configuring the ASR 220a to use a virtual dictation grammar having decoy words for out-of-vocabulary words, reduced vocabularies derived from a conversation history, or other dynamic recognition grammars (e.g., grammars optimized for particular languages, contexts, domains, memory constraints, and/or other suitable criteria). In another example, the on-board applications 234a and/or data repositories 236a may be associated with an embedded application suite providing particular features and capabilities for the voice-enabled client device 210. For example, the voice-enabled client device 210 may be embedded within an automotive telematics system, a personal navigation device, a global positioning system, a mobile phone, or another device in which users often request location-based services. Thus, in such circumstances, the on-board applications 234a and the data repositories 236a in the embedded application suite may be optimized to provide certain location-based services that can be efficiently processed on-board (e.g., destination entry, navigation, map control, music search, hands-free dialing, etc.).

Furthermore, although the components of the voice-enabled client device 210 may be optimized for efficiency in embedded architectures, a user may nonetheless request any suitable content, services, applications, and/or other features available in the hybrid processing environment, and the other devices in the hybrid processing environment may collectively provide natural language processing capabilities to supplement the embedded natural language processing capabilities for the voice-enabled client device 210. For example, the voice-enabled client device 210 may perform preliminary processing for a particular multi-modal interaction using the embedded natural language processing capabilities (e.g., the on-board ASR 220*a* may perform advanced virtual dictation to partially transcribe an utterance in the multi-modal interaction, the on-board conversational language processor 230*a* may determine a preliminary intent of the multi-modal interaction, etc.), wherein results of the preliminary processing may be provided to the virtual router 260 for further processing.

In one implementation, the voice-enabled client device 210 may also communicate input corresponding to the multi-modal interaction to the virtual router 260 in response to determining that on-board capabilities cannot suitably interpret the interaction (e.g., if a confidence level for a partial transcription does not satisfy a particular threshold), or in response to determining that the interaction should be processed off-board (e.g., if a preliminary interpretation indicates that the interaction relates to a local search request requiring large computations to be performed on the voice-enabled server 240). As such, the virtual router 260 may capture the input received from the voice-enabled client device 210 and coordinate further processing among the voice-enabled devices 270 and the voice-enabled server 240 that provide natural language processing capabilities in addition to the non-voice devices 280 that provide capabilities for retrieving data or executing tasks. Furthermore, in response to the virtual router 260 invoking one or more of the voice-enabled devices 270, the input provided to the voice-enabled devices 270 may be optimized to suit the processing requested from the invoked voice-enabled devices 270 (e.g., to avoid over-taxing processing resources, a particular voice-enabled device 270 may be provided a partial transcription or a preliminary interpretation and resolve the intent for a given context or domain).

Alternatively, in response to the virtual router 260 invoking the voice-enabled server 240, the input provided to the voice-enabled devices 270 may further include encoded audio corresponding to natural language utterances and any other data associated with the multi-modal interaction. In particular, as shown in FIG. 2, the voice-enabled server 240 may have a natural language processing architecture similar to the voice-enabled client device 210, except that the voice-enabled server 240 may include substantial processing resources that obviate constraints that the voice-enabled client device 210 may be subject to. Thus, when the voice-enabled server 240 cooperates in the hybrid processing for the multi-modal interaction, the encoded audio corresponding to the natural language utterances and the other data associated with the multi-modal interaction may be provided to the voice-enabled server 240 to maximize a likelihood of the voice-enabled server 240 correctly determining the intent of the multi-modal interaction (e.g., the ASR 220*b* may perform multi-pass speech recognition to generate an accurate transcription for the natural language utterance, the conversational language processor 230*b* may arbitrate among intent determinations performed in any number of different contexts or domains, etc.). Accordingly, in summary, the hybrid processing techniques performed in the environment illustrated in FIG. 2 may generally include various different devices, which may or may not include natural language capabilities, cooperatively determining the intent of a particular multi-modal interaction and taking action to resolve the intent.

Although the cooperative hybrid processing techniques described above have been particularly described in the context of an embedded processing architecture, such techniques are not necessarily limited to embedded processing architectures. In particular, the same techniques may be applied in any suitable voice services environment having various devices that can cooperate to initiate queries, tasks, commands, or other requests to resolve the intent of multi-modal interactions. Furthermore, in one implementation, the voice-enabled client device 210 may include a suitable amount of memory or other resources that can be dedicated to natural language processing (e.g., the voice-enabled client device 210 may be a desktop computer or other device that can process natural language without substantially degraded performance). In such circumstances, one or more of the components of the voice-enabled client device 210 may be configured to optimize the on-board natural language processing in a manner that could otherwise cause bottlenecks, lengthy response times, or degradations in performance in an embedded architecture. For example, in one implementation, optimizing the on-board natural language processing may include configuring the ASR 220*a* to use a large list dictation grammar in addition to and/or instead of the virtual dictation grammar used in embedded processing architectures.

Nonetheless, as will be described in greater detail below in connection with FIGS. 3-5, the cooperative hybrid processing techniques may be substantially similar regardless of whether the voice-enabled client device 210 has an embedded or non-embedded architecture. In particular, regardless of the architecture for the voice-enabled client device 210, cooperative hybrid processing may include the voice-enabled client device 210 optionally performing preliminary processing for a natural language multi-modal interaction and communicating input corresponding to the multi-modal interaction to the virtual router 260 for further processing through the messaging interface 250*a*. Alternatively (or additionally), the cooperative hybrid processing may include the virtual router 260 coordinating the further processing for the input among the various devices in the hybrid environment through messaging interface 250*b*, and subsequently returning any results of the processing to the voice-enabled client device 210 through messaging interface 250*a*.

Figure 3:
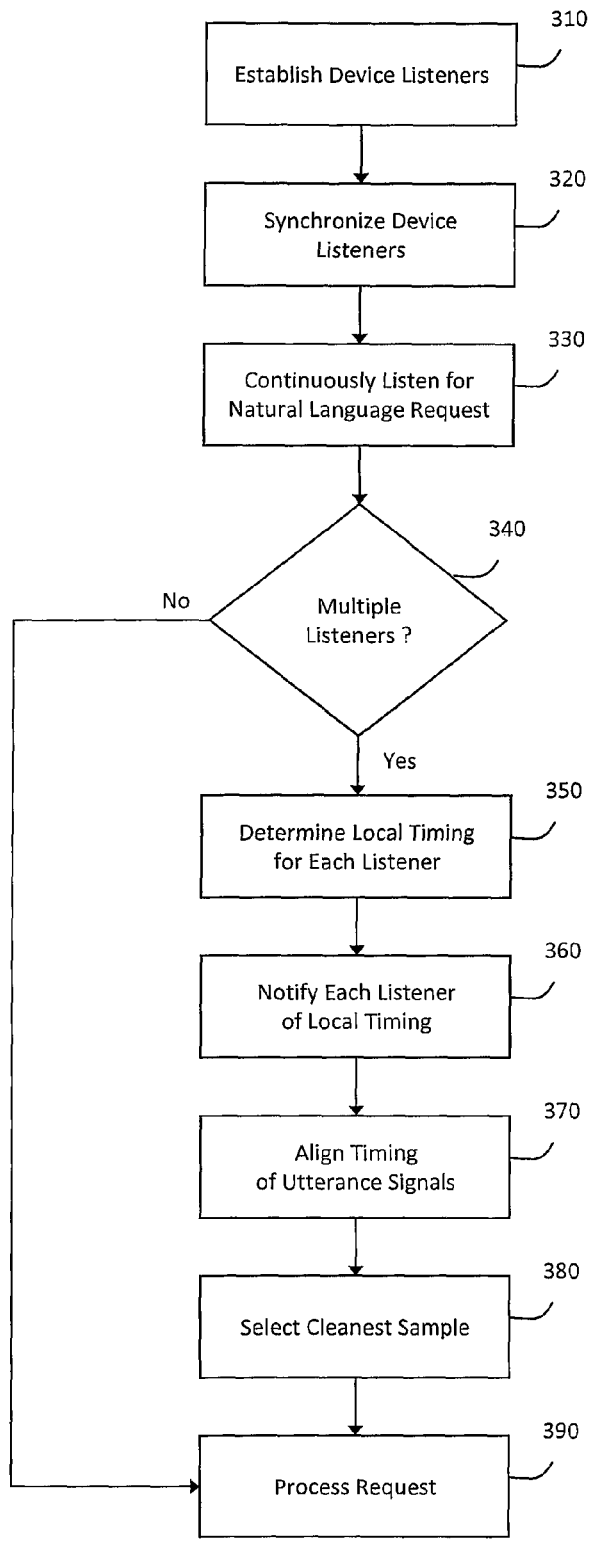
FIG. 3 illustrates a flow diagram of an exemplary method for initializing various devices that cooperate to perform hybrid processing in a natural language voice services environment, according to one aspect of the invention.

According to various aspects of the invention, FIG. 3 illustrates a flow diagram of an exemplary method for initializing various devices that cooperate to perform hybrid processing in a natural language voice services environment. In particular, as noted above, the hybrid processing environment may generally include communication among various different devices that may cooperatively process natural language multi-modal interactions. For example, in one implementation, the various devices in the hybrid processing environment may include a virtual router having one or more messaging interfaces for communicating with one or more voice-enabled devices, one or more non-voice devices, and/or a voice-enabled server. As such, in one implementation, the method illustrated in FIG. 3 may be used to initialize communication in the hybrid processing environment to enable subsequent cooperative processing for one or more natural language multi-modal interactions received at any particular device in the hybrid processing environment.

In one implementation, the various devices in the hybrid processing environment may be configured to continually listen or otherwise monitor respective input devices to determine whether a natural language multi-modal interaction has occurred. As such, the method illustrated in FIG. 3 may be used to calibrate, synchronize, or otherwise initialize the various devices that continually listen for the natural language multi-modal interactions. For example, as described above in connection with FIG. 2, the virtual router, the voice-enabled devices, the non-voice devices, the voice-enabled server, and/or other devices in the hybrid processing environment may be configured to provide various different capabilities or services, wherein the initialization method illustrated in FIG. 3 may be used to ensure that the hybrid processing environment obtains a suitable signal to process any particular natural language multi-modal interaction and appropriately invoke one or more of the devices to cooperatively process the natural language multi-modal interaction. Furthermore, the method illustrated in FIG. 3 and described herein may be invoked to register the various devices in the hybrid processing environment, register new devices added to the hybrid processing environment, publish domains, services, intent determination capabilities, and/or other features supported on the registered devices, synchronize local timing for the registered devices, and/or initialize any other suitable aspect of the devices in the hybrid processing environment.

In one implementation, initializing the various devices in the hybrid processing environment may include an operation 310, wherein a device listener may be established for each of the devices in the hybrid processing environment. The device listeners established in operation 310 may generally include any suitable combination of instructions, firmware, or other routines that can be executed on the various devices to determine capabilities, features, supported domains, or other information associated with the devices. For example, in one implementation, the device listeners established in operation 310 may be configured to communicate with the respective devices using the Universal Plug and Play protocol designed for ancillary computer devices, although it will be apparent that any appropriate mechanism for communicating with the various devices may be suitably substituted.

In response to establishing the device listeners for each device registered in the hybrid processing environment (or in response to establishing device listeners for any device newly registered in the hybrid processing environment), the device listeners may then be synchronized in an operation 320. In particular, each of the registered devices may have an internal clock or other timing mechanism that indicates local timing for an incoming natural language multi-modal interaction, wherein operation 320 may be used to synchronize the device listeners established in operation 310 according to the internal clocks or timing mechanisms for the respective devices. Thus, in one implementation, synchronizing the device listeners in operation 320 may include each device listener publishing information relating to the internal clock or local timing for the respective device. For example, the device listeners may publish the information relating to the internal clock or local timing to the virtual router, whereby the virtual router may subsequently coordinate cooperative hybrid processing for natural language multi-modal interactions received at one or more of the devices in the hybrid processing environment. It will be apparent, however, that the information relating to the internal clock or local timing for the various devices in the hybrid processing environment may be further published to the other voice-enabled devices, the other non-voice devices, the voice-enabled server, and/or any other suitable device that may participate in cooperative processing for natural language multi-modal interactions provided to the hybrid processing environment.

In one implementation, in response to establishing and synchronizing the device listeners for the various devices registered in the hybrid processing environment, the device listeners may continually listen or otherwise monitor respective devices on the respective registered devices in an operation 330 to detect information relating to one or more natural language multi-modal interactions. For example, the device listeners may be configured to detect occurrences of the natural language multi-modal interactions in response to detecting an incoming natural language utterance, a point of focus or attention focus selection associated with an incoming natural language utterance, and/or another interaction or sequence of interactions that relates to an incoming natural language multi-modal interaction. In addition, operation 330 may further include the appropriate device listeners capturing the natural language utterance and/or related non-voice device interactions that relate to the natural language utterance.

In one implementation, the captured natural language utterance and related non-voice device interactions may then be analyzed in an operation 340 to manage subsequent cooperative processing in the hybrid processing environment. In one implementation, for example, operation 340 may determine whether one device listener or multiple device listeners captured information relating to the natural language multi-modal interaction detected in operation 330. In particular, as noted above, the hybrid processing environment may generally include various different devices that cooperate to process natural language multi-modal interactions, whereby the information relating to the natural language multi-modal interaction may be provided to one or a plurality of the devices in the hybrid processing environment. As such, operation 340 may determine whether one device listener or multiple device listeners captured the information relating to the natural language multi-modal interaction in order to determine whether the hybrid processing environment needs to synchronize signals among various device listeners that captured information relating to the multi-modal interaction.

For example, a user interacting with the hybrid processing environment may view a web page presented on a non-voice display device and provide a natural language multi-modal interaction that requests more information about purchasing a product displayed on the web page. The user may then select text on the web page containing the product name using a mouse, keyboard, or other non-voice input device and provide a natural language utterance to a microphone or other voice-enabled device such as "Is this available on Amazon.com?" In this example, a device listener associated with the non-voice display device may detect the text selection for the product name in operation 330, and a device listener associated with the voice-enabled device may further detect the natural language utterance inquiring about the availability of the product in operation 330. Furthermore, in one implementation, the user may be within a suitable range of multiple voice-enabled devices, which may result in multiple device listeners capturing different signals corresponding to the natural language utterance (e.g., the interaction may occur within range of a voice-enabled mobile phone, a voice-enabled telematics device, and/or other voice-enabled devices, depending on the arrangement and configuration of the various devices in the hybrid processing environment).

Accordingly, as will be described in greater detail herein, a sequence of operations that synchronizes different signals relating to the multi-modal interaction received at the multiple device listeners may be initiated in response to operation 340 determining that multiple device listeners captured information relating to the natural language multi-modal interaction. On the other hand, in response to operation 340 determining that only one device listener captured information relating to the natural language multi-modal interaction, the natural language multi-modal interaction may be processed in an operation 390 without executing the sequence of operations that synchronizes different signals (i.e., the one device listener provides all of the input information relating to the multi-modal interaction, such that hybrid processing for the interaction may be initiated in operation 390 without synchronizing different input signals). However, in one implementation, the sequence of synchronization operations may also be initiated in response to one device listener capturing a natural language utterance and one or more non-voice interactions to align different signals relating to the natural language multi-modal interaction, as described in greater detail herein.

As described above, each device listener that receives an input relating to the natural language multi-modal interaction detected in operation 330 may have an internal clock or other local timing mechanism. As such, in response to determining that one or more device listeners captured different signals relating to the natural language multi-modal interaction in operation 340, the sequence of synchronization operations for the different signals may be initiated in an operation 350. In particular, operation 350 may include the one or more device listeners determining local timing information for the respective signals based on the internal clock or other local timing mechanism associated with the respective device listeners, wherein the local timing information determined for the respective signals may then be synchronized.

For example, in one implementation, synchronizing the local timing information for the respective signals may be initiated in an operation 360. In particular, operation 360 may generally include notifying each device listener that received an input relating to the multi-modal interaction of the local timing information determined for each respective signal. For example, in one implementation, each device listener may provide local timing information for a respective signal to the virtual router, and the virtual router may then provide the local timing information for all of the signals to each device listener. As such, in one implementation, operation 360 may result in each device listener receiving a notification that includes local timing information for each of the different signals that relate to the natural language multi-modal interaction detected in operation 330. Alternatively (or additionally), the virtual router may collect the local timing information for each of the different signals from each of the device listeners and further synchronize the local timing information for the different signals to enable hybrid processing for the natural language multi-modal interaction.

In one implementation, any particular natural language multi-modal interaction may include at least a natural language utterance, and may further include one or more additional device interactions relating to the natural language utterance. As noted above, the utterance may generally be received prior to, contemporaneously with, or subsequent to the additional device interactions. As such, the local timing information for the different signals may be synchronized in an operation 370 to enable hybrid processing for the natural language multi-modal interaction. In particular, operation 370 may include aligning the local timing information for one or more signals corresponding to the natural language utterance and/or one or more signals corresponding to any additional device interactions that relate to the natural language utterance. In addition, operation 370 may further include aligning the local timing information for the natural language utterance signals with the signals corresponding to the additional device interactions.

Thus, in matching the utterance signals and the non-voice device interaction signals, any devices that participate in the hybrid processing for the natural language multi-modal interaction may be provided with voice components and/or non-voice components that have been aligned with one another. For example, in one implementation, operation 370 may be executed on the virtual router, which may then provide the aligned timing information to any other device that may be invoked in the hybrid processing. Alternatively (or additionally), one or more of the other devices that participate in the hybrid processing may locally align the timing information (e.g., in response to the virtual router invoking the voice-enabled server in the hybrid processing, resources associated with the voice-enabled server may be employed to align the timing information and preserve communication bandwidth at the virtual router).

Furthermore, in one implementation, the virtual router and/or other devices in the hybrid processing environment may analyze the signals corresponding to the natural language utterance in an operation 380 to select the cleanest sample for further processing. In particular, as noted above, the virtual router may include a messaging interface for receiving an encoded audio sample corresponding to the natural language utterance from one or more of the voice-enabled devices. For example, the audio sample received at the virtual router may include the natural language utterance encoded in the MPEG-1 Audio Layer 3 (MP3) format or another lossy format to preserve communication bandwidth in the hybrid processing environment. However, it will be apparent that the audio sample may alternatively (or additionally) be encoded using the Free Lossless Audio Codec (FLAC) format or another lossless format in response to the hybrid processing environment having sufficient communication bandwidth for processing lossless audio that may provide a better sample of the natural language utterance.

Regardless of whether the audio sample has been encoded in a lossy or lossless format, the signal corresponding to the natural language utterance that provides the cleanest sample may be selected in operation 380. For example, one voice-enabled device may be in a noisy environment or otherwise associated with conditions that interfere with generating a clean audio sample, while another voice-enabled device may include a microphone array or be configured to employ techniques that maximize fidelity of encoded speech. As such, in response to multiple signals corresponding to the natural language utterance being received in operation 330, the cleanest signal may be selected in operation 380 and hybrid processing for the natural language utterance may then be initiated in an operation 390.

Accordingly, the synchronization and initialization techniques illustrated in FIG. 3 and described herein may ensure that the hybrid processing environment synchronizes each of the signals corresponding to the natural language multi-modal interaction and generates an input for further processing in operation 390 most likely to result in a correct intent determination. Furthermore, in synchronizing the signals and selecting the cleanest audio sample for the further processing in operation 390, the techniques illustrated in FIG. 3 and described herein may ensure that none of the devices in the hybrid processing environment take action on a natural language multi-modal interaction until the appropriate signals to be used in operation 390 have been identified. As such, hybrid processing for the natural language multi-modal interaction may be initiated in operation 390, as described in further detail herein.

Figure 4:
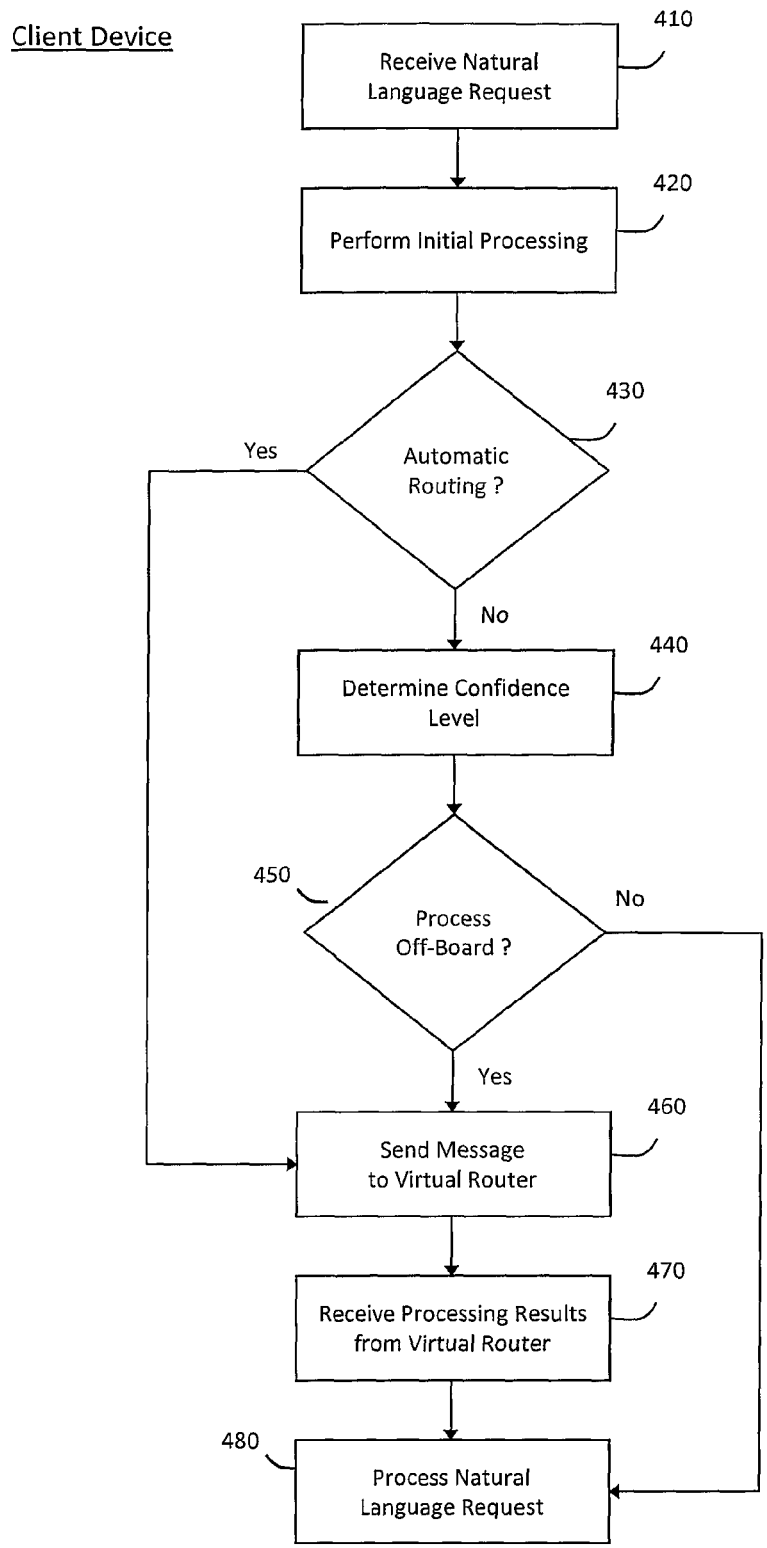
FIGS. 4-5 illustrate flow diagrams of exemplary methods for hybrid processing in a natural language voice services environment, according to one aspect of the invention.

According to one aspect of the invention, FIG. 4 illustrates a flow diagram of am exemplary method for performing hybrid processing at one or more client devices in a natural language voice services environment. In particular, as will be described in greater below with reference to FIG. 5, the one or more client devices may perform the hybrid processing in cooperation with a virtual router through a messaging interface that communicatively couples the client devices and the virtual router. For example, in one implementation, the messaging interface may generally include a light client (or thin client) that provides a mechanism for the client devices to transmit input relating to a natural language multi-modal interaction to the virtual router, and that further provides a mechanism for the client devices to receive output relating to the natural language multi-modal interaction from the virtual router.

For example, in one implementation, the hybrid processing at the client devices may be initiated in response to one or more of the client devices receiving a natural language multi-modal interaction in an operation 410. In particular, the natural language multi-modal interaction may generally include a natural language utterance received at a microphone or other voice-enabled input device coupled to the client device that received the natural language multi-modal interaction, and may further include one or more other additional input modalities that relate to the natural language utterance (e.g., text selections, button presses, multi-touch gestures, etc.). As such, the natural language multi-modal interaction received in operation 410 may include one or more queries, commands, or other requests provided to the client device, wherein the hybrid processing for the natural language multi-modal interaction may then be initiated in an operation 420.

As described in greater detail above, the natural language voice services environment may generally include one or more voice-enabled client devices, one or more non-voice devices, a voice-enabled server, and a virtual router arranged to communicate with each of the voice-enabled client devices, the non-voice devices, and the voice-enabled server. In one implementation, the virtual router may therefore coordinate the hybrid processing for the natural language multi-modal interaction among the voice-enabled client devices, the non-voice devices, and the voice-enabled server. As such, the hybrid processing techniques described herein may generally refer to the virtual router coordinating cooperative processing for the natural language multi-modal interaction in a manner that involves resolving an intent of the natural language multi-modal interaction in multiple stages.

In particular, as described above in connection with FIG. 3, the various devices that cooperate to perform the hybrid processing may be initialized to enable the cooperative processing for the natural language multi-modal interaction. As such, in one implementation, in response to initializing the various devices, each of the client devices that received an input relating to the natural language multi-modal interaction may perform initial processing for the respective input in an operation 420. For example, in one implementation, a client device that received the natural language utterance included in the multi-modal interaction may perform initial processing in operation 420 that includes encoding an audio sample corresponding to the utterance, partially or completely transcribing the utterance, determining a preliminary intent for the utterance, or performing any other suitable preliminary processing for the utterance. In addition, the initial processing in operation 420 may also be performed at a client device that received one or more of the additional input modalities relating to the utterance. For example, the initial processing performed in operation 420 for the additional input modalities may include identifying selected text, selected points of focus or attention focus, or generating any other suitable data that can be used to further interpret the utterance. In one implementation, an operation 430 may then include determining whether the hybrid processing environment has been configured to automatically route inputs relating to the natural language multi-modal interaction to the virtual router.

For example, in one implementation, operation 430 may determine that automatic routing has been configured to occur in response to multiple client devices receiving the natural language utterance included in the multi-modal interaction in operation 410. In this example, the initial processing performed in operation 420 may include the multiple client devices encoding respective audio samples corresponding to the utterance, wherein messages that include the encoded audio samples may then be sent to the virtual router in an operation 460. The virtual router may then select one of the encoded audio samples that provides a cleanest signal and coordinate subsequent hybrid processing for the natural language multi-modal interaction, as will be described in greater detail below with reference to FIG. 5. In another example, operation 430 may determine that automatic routing has been configured to occur in response to the initial processing resulting in a determination that the multi-modal interaction relates to a request that may be best suited for processing on the voice-enabled server (e.g., the request may relate to a location-based search query or another command or task that requires resources managed on the voice-enabled server, content, applications, domains, or other information that resides on one or more devices other than the client device that received the request, etc.). However, it will be apparent that the hybrid processing environment may be configured for automatic routing in response to other conditions and/or regardless of whether any attendant conditions exist, as appropriate.

In one implementation, in response to the virtual router coordinating the hybrid processing for the natural language multi-modal interaction, the virtual router may provide results of the hybrid processing to the client device in an operation 470. For example, the results provided to the client device in operation 470 may include a final intent determination for the natural language multi-modal interaction, information requested in the interaction, data generated in response to executing a command or task requested in the interaction, and/or other results that enable the client device to complete processing for the natural language request in operation 480. For example, in one implementation, operation 480 may include the client device executing a query, command, task, or other request based on the final intent determination returned from the virtual router, presenting the requested information returned from the virtual router, confirming that the requested command or task has been executed, and/or performing any additional processing to resolve the natural language request.

Referring back to operation 430, in response to determining that the conditions that trigger automatic routing have not been satisfied or that automatic router has otherwise not been configured, the client device may further process the natural language multi-modal interaction in an operation 440. In one implementation, the further processing in operation 440 may include the client device attempting to determine an intent for the natural language multi-modal interaction using local natural language processing capabilities. For example, the client device may merge any non-voice input modalities included in the multi-modal interaction a transcription for the utterance included in the multi-modal interaction. The conversational language processor on the client device may then determine the intent for the multi-modal interaction utilizing local information relating to context, domains, shared knowledge, criteria values, or other information. The client device may then generate one or more interpretations for the utterance to determine the intent for the multi-modal interaction (e.g., identifying a conversation type, one or more requests contained in the interactions, etc.).

In one implementation, operation 440 may further include determining a confidence level for the intent determination generated on the client device (e.g., the confidence level may be derived in response to whether the client devices includes a multi-pass speech recognition engine, whether the utterance contained any ambiguous words or phrases, whether the intent differs from one context to another, etc.). In one implementation, an operation 450 may then determine whether or not to invoke off-board processing depending on the confidence level determined in operation 440. For example, operation 450 may generally include determining whether the intent determined in operation 440 satisfies a particular threshold value that indicates an acceptable confidence level for taking action on the determined intent. As such, in response to the confidence level for the intent determination satisfying the threshold value, operation 450 may determine to not invoke off-board processing. In particular, the confidence level satisfying the threshold value may indicate that the client device has sufficient information to take action on the determined intent, whereby the client device may then process one or more queries, commands, tasks, or other requests to resolve the multi-modal interaction in operation 480.

Alternatively, in response to the confidence level for the intent determination failing to satisfy the threshold value, operation 450 may invoke off-board processing, which may include sending one or more messages to the virtual router in operation 460. The one or more messages may cause the virtual router to invoke additional hybrid processing for the multi-modal interaction in a similar manner as noted above, and as will be described in greater detail herein with reference to FIG. 5.

Figure 5:
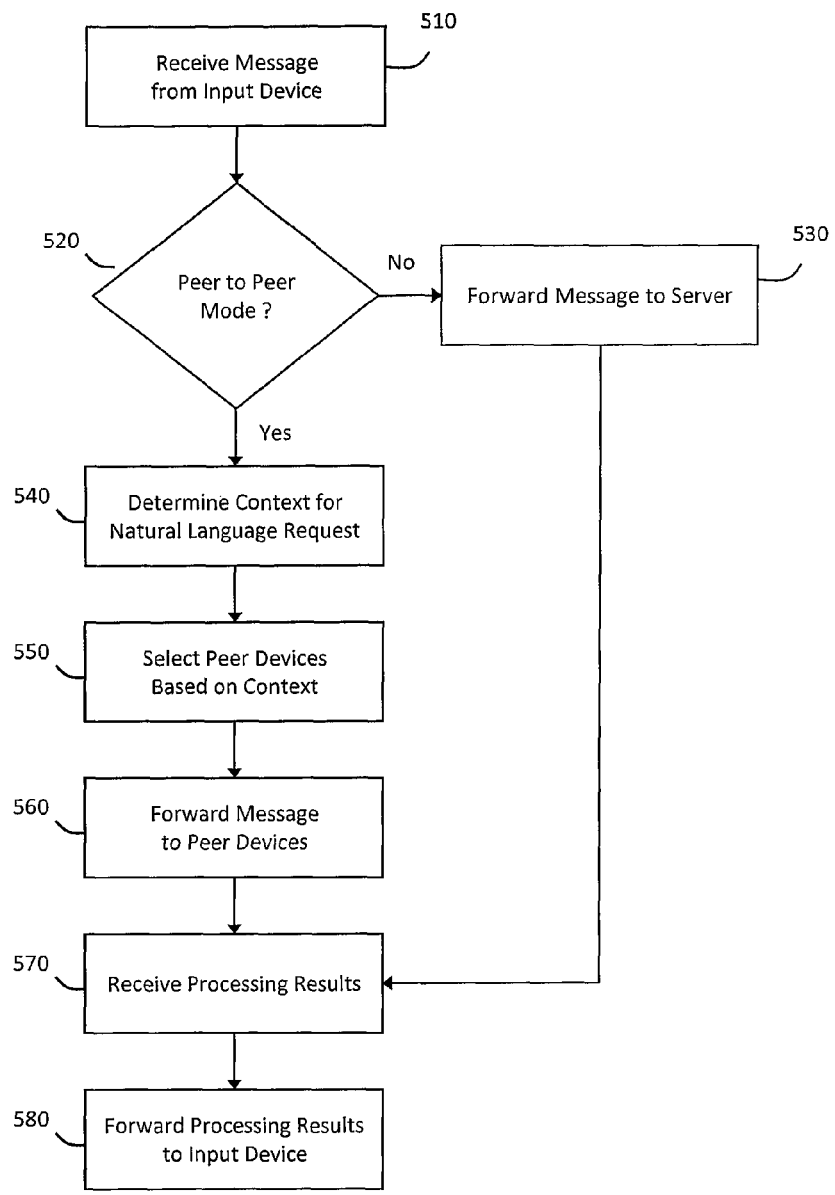

According to one aspect of the invention, FIG. 5 illustrates a flow diagram of am exemplary method for performing hybrid processing at a virtual router in a natural language voice services environment. In particular, as the virtual router may coordinate the hybrid processing for natural language multi-modal interactions received at one or more client devices. In one implementation, in an operation 510, the virtual router may receive one or more messages relating to a natural language multi-modal interaction received at one or more of the client devices in the voice services environment. For example, the virtual router may include a messaging interface that communicatively couples the virtual router to the client devices and a voice-enabled server, wherein the messaging interface may generally include a light client (or thin client) that provides a mechanism for the virtual router to receive input from one or more the client devices and/or the voice-enabled server, and further to transmit output to one or more the client devices and/or the voice-enabled server. The messages received in operation 510 may generally include any suitable processing results for the multi-modal interactions, whereby the virtual router may coordinate hybrid processing in a manner that includes multiple processing stages that may occur at the virtual router, one or more of the client devices, the voice-enabled server, or any suitable combination thereof.

In one implementation, the virtual router may analyze the messages received in operation 510 to determine whether to invoke the hybrid processing in a peer-to-peer mode. For example, one or more of the messages may include a preliminary intent determination that the virtual router can use to determine whether to invoke one or more of the client devices, the voice-enabled server, or various combinations thereof in order to execute one or more of the multiple processing stages for the multi-modal interaction. In another example, one or more of the messages may include an encoded audio sample that the virtual router forwards to one or more of the various devices in the hybrid processing environment. As such, in one implementation, the virtual router may analyze the messages received in operation 510 to determine whether or not to invoke the voice-enabled server to process the multi-modal interaction (e.g., the messages may include a preliminary intent determination that indicates that the multi-modal interaction includes a location-based request that requires resources residing on the server).

In response to the virtual router determining to invoke the voice-enabled server, the virtual router may forward the messages to the server in an operation 530. In particular, the messages forwarded to the server may generally include the encoded audio corresponding to the natural language utterance and any additional information relating to other input modalities relevant to the utterance. For example, as described in greater detail above with reference to FIG. 2, the voice-enabled server may include various natural language processing components that can suitably determine the intent of the multi-modal interaction, whereby the messages sent to the voice-enabled server may include the encoded audio in order to permit the voice-enabled server to determine the intent independently of any preliminary processing on the client devices that may be inaccurate or incomplete. In response to the voice-enabled server processing the messages received from the virtual router, results of the processing may then be returned to the virtual router in an operation 570. For example, the results may include the intent determination for the natural language multi-modal interaction, results of any queries, commands, tasks, or other requests performed in response to the determined intent, or any other suitable results, as will be apparent.

Alternatively, in response to the virtual router determining to invoke the peer-to-peer mode in operation 520, the virtual router may coordinate the hybrid processing among one or more the client devices, the voice-enabled server, or any suitable combination thereof. For example, in one implementation, the virtual router may determine a context for the natural language multi-modal interaction in an operation 540 and select one or more peer devices based on the determined context in an operation 550. For example, one or more of the client devices may be configured to provide content and/or services in the determined context, whereby the virtual router may forward one or more messages to such devices in an operation 560 in order to request such content and/or services. In another example, the multi-modal interaction may include a compound request that relates to multiple contexts supported on different devices, whereby the virtual router may forward messages to each such device in operation 560 in order to request appropriate content and/or services in the different contexts.

In still another example, the interaction may include a request to be processed on the voice-enabled server, yet the request may require content and/or services that reside on one or more of the client devices (e.g., a location-based query relating to an entry in an address book on one or more of the client devices). As such, the virtual router may generally forward various messages to the selected peer devices in operation 560 to manage the multiple stages in the hybrid processing techniques described herein. For example, the virtual router may send messages to one or more voice-enabled client devices that have intent determination capabilities in a particular context, one or more non-voice client devices that have access to content, services, and/or other resources needed to process the multi-modal interaction, or any appropriate combination thereof. The virtual router may therefore send messages to the client devices and/or the voice-enabled server in operation 560 and receive responsive messages from the client devices and/or the voice-enabled server in operation 570 in any appropriate manner (e.g., in parallel, sequentially, iteratively, etc.). The virtual router may then collate the results received in the responsive messages in operation 580 and return the results to one or more of the client devices for any final processing and/or presentation of the results.

Implementations of the invention may be made in hardware, firmware, software, or various combinations thereof. The invention may also be implemented as instructions stored on a machine-readable medium, which may be read and executed by one or more processors. A machine-readable medium may include various mechanisms for storing or transmitting information in a form readable by a machine (e.g., a computing device). For example, a machine-readable storage medium may include read only memory, random access memory, magnetic disk storage media, optical storage media, flash memory devices, or other storage media, and a machine-readable transmission media may include forms of propagated signals, such as carrier waves, infrared signals, digital signals, or other transmission media. Further, firmware, software, routines, or instructions may be described in the above disclosure in terms of specific exemplary aspects and implementations of the invention, and performing certain actions. However, it will be apparent that such descriptions are merely for convenience, and that such actions in fact result from computing devices, processors, controllers, or other devices executing the firmware, software, routines, or instructions.

Accordingly, aspects and implementations of the invention may be described herein as including a particular feature, structure, or characteristic, but it will be apparent that every aspect or implementation may or may not necessarily include the particular feature, structure, or characteristic. In addition, when a particular feature, structure, or characteristic has been described in connection with a given aspect or implementation, it will be understood that such feature, structure, or characteristic may be included in connection with other aspects or implementations, whether or not explicitly described. Thus, various changes and modifications may be made to the preceding description without departing from the scope or spirit of the invention, and the specification and drawings should therefore be regarded as exemplary only, with the scope of the invention determined solely by the appended claims.

What is claimed is:

1. A method of natural language utterance processing, the method being implemented in a computer system that includes one or more physical processors executing one or more computer program instructions which, when executed, perform the method, the method comprising:

receiving, at the computer system, from a first user device, a natural language utterance;

performing, at the computer system, speech recognition to determine one or more words of the natural language utterance;

receiving, at the computer system, from a second user device, a non-voice user input that relates to the natural language utterance, wherein the first user device and the second user device are associated with a user and are independently operable of one another and of the computer system;

processing, at the computer system, the non-voice user input to determine context information for the one or more words;

determining, at the computer system, one or more interpretations of the one or more words based on the context information;

generating, at the computer system, a user request related to the natural language utterance based on the one or more interpretations;

selecting, at the computer system, at least one user processing device to process the user request such that the selection of the user processing device is based on a determination that content related to the user request resides at the user processing device, wherein the user processing device comprises the first user device, the second user device, or a third user device independently operable of the computer system; and transmitting, by the computer system, the user request to the user processing device to invoke the user processing device to process the user request.

2. The method of claim 1, further comprising:

receive, at the computer system, information related to local timing mechanisms of a plurality of user devices, wherein the local timing mechanisms comprises a first local timing mechanism of the first user device and a second local timing mechanism of the second user device;

determining, at the computer system, based on the first local timing mechanism, first timing information relating to a time of receipt of the natural language utterance at the first user device;

determining, at the computer system, based on the second local timing mechanism, second timing information relating to a time of receipt of the non-voice user input at the second user device; and determining, at the computer system, whether the natural language utterance and the non-voice user input relate to one another based on the first and second timing information, wherein determining the one or more interpretations comprises determining the one or more interpretations using the context information based on a determination that the natural language utterance and the non-voice user input relate to one another.

3. The method of claim 2, further comprising:

determining, at the computer system, an order sequence among the natural language utterance and the non-voice user input based on the first and second timing information, wherein generating the user request comprises generating the user request based on the order sequence.

4. The method of claim 1, further comprising:

receiving, at the computer system, another natural language utterance from a device different than the first user device, wherein the natural language utterance and the other natural language utterance are received in response to a capturing of an utterance from the user while the user is in proximity to the first user device and the device different than the first user device, wherein the speech recognition is performed on the natural language utterance based on a determination that the natural language utterance is a cleaner sample of the utterance than the other natural language utterance.

5. The method of claim 1, wherein the first user device and the second user device are mobile devices.

6. The method of claim 1, further comprising:
obtaining, at the computer system, one or more personalized cognitive models associated with the user, wherein the one or more personalized cognitive models are based on one or more prior user inputs associated with the user, and wherein the one or more interpretations are determined further based on the one or more personalized cognitive models.

7. The method of claim 1, wherein the user request comprises a query, and wherein the user processing device is selected based on a determination that content related to the query resides at the user processing device.

8. The method of claim 1, wherein the one or more words include a reference word, wherein the context information indicates context for the reference word, and wherein determining the one or more interpretations comprises:
identifying the reference word;
determining, based on the reference word context, an item to which the reference word refers; and
determining the one or more interpretations based on the determined item.

9. The method of claim 1, wherein the non-voice user input identifies text selected by the user, and the context information is determined based on the text.

10. The method of claim 1, wherein the non-voice user input identifies a point of focus on a user interface, and the context information is determined based on the point of focus.

11. The method of claim 1, further comprising:
determining, at the computer system, additional context information based on one or more of the natural language utterance or the non-voice user input,
wherein the selection of the user processing device is based on the additional context information.

12. The method of claim 1, further comprising:
receiving, at the computer system, from the first user device, a transcription of at least part of the natural language utterance, wherein the transcription comprises one or more other words of the natural language utterance,
wherein determining the one or more interpretations comprises determining, based on the context information, an interpretation of the one or more words and the one or more other words in the transcription, and
wherein the user request related to the natural language utterance is generated based on the interpretation of the one or more words and the one or more other words in the transcription.

13. The method of claim 1, wherein the computer system comprises one or more servers and a virtual router that is independently operable of the one or more servers,
wherein receiving the natural language utterance comprises receiving, at the virtual router, the natural language utterance from the first user device, and
wherein receiving the non-voice input comprises receiving, at the virtual router, the non-voice user input from the second user device, the method further comprising:
transmitting, by the virtual router, the natural language utterance and the non-voice user input to the one or more servers; and
receiving, at the virtual router, the user request from the one or more servers,
wherein selecting the user processing device comprises selecting, at the virtual router, from among a plurality of user processing devices, the user processing device to process the user request, the selection at the virtual router being based on the determination that content related to the user request resides at the user processing device, and
wherein transmitting the user request comprises transmitting, by the virtual router, the user request to the selected user processing device to invoke the selected user processing device to process the user request.

14. The method of claim 13, further comprising:
selecting, at the virtual router, from among the one or more servers and the plurality of user processing devices, the one or more servers to determine the one or more words and the context information,
wherein the natural language utterance and the non-voice user input are transmitted to the one or more servers based on the selection of the one or more servers.

15. The method of claim 13, further comprising:
receiving, at the virtual router, a second natural language utterance;
selecting, at the virtual router, based on context information associated with the second natural language utterance, at least one of the user processing device or another user processing device to determine one or more interpretations of the second natural language utterance;
transmitting, by the virtual router, the second natural language utterance to the selected at least one of the user processing devices to invoke the selected at least one of the user processing devices to determine the one or more interpretations of the second natural language utterance;
receiving, at the virtual router, from the selected at least one of the user processing devices, the one or more interpretations of the second natural language utterance; and
transmitting, by the virtual router, the one or more interpretations of the second natural language utterance to one or more of the plurality of user processing devices.

16. A system for natural language utterance processing, the system comprising:
one or more physical processors programmed to execute one or more computer program instructions which, when executed, cause the one or more physical processors to:
receive, from a first user device, a natural language utterance;
perform speech recognition to determine one or more words of the natural language utterance;
receive, from a second user device, a non-voice user input that relates to the natural language utterance, wherein the first user device and the second user device are associated with a user and are independently operable of one another and of the computer system;
process the non-voice user input to determine context information for the one or more words;
determine one or more interpretations of the one or more words based on the context information;
generate a user request related to the natural language utterance based on the one or more interpretations;
select at least one user processing device to process the user request such that the selection of the user processing device is based on a determination that content related to the user request resides at the user processing device, wherein the user processing device comprises the first user device, the second user device, or a third user device independently operable of the computer system; and transmit the user request to the user processing device to invoke the user processing device to process the user request.

17. The system of claim 16, wherein the one or more physical processors are further caused to:
receive, at the computer system, information related to local timing mechanisms of a plurality of user devices, wherein the local timing mechanisms comprises a first local timing mechanism of the first user device and a second local timing mechanism of the second user device;
determine, based on the first local timing mechanism, first timing information relating to a time of receipt of the natural language utterance at the first user device;
determine, based on the second local timing mechanism, second timing information relating to a time of receipt of the non-voice user input at the second user device; and
determine whether the natural language utterance and the non-voice user input relate to one another based on the first and second timing information,
wherein determining the one or more interpretations comprises determining the one or more interpretations using the context information based on a determination that the natural language utterance and the non-voice user input relate to one another.

18. The system of claim 17, wherein the one or more physical processors are further caused to:
determine an order sequence among the natural language utterance and the non-voice user input based on the first and second timing information,
wherein generating the user request comprises generating the user request based on the order sequence.

19. The system of claim 16, wherein the one or more physical processors are further caused to:
receive another natural language utterance from a device different than the first user device, wherein the natural language utterance and the other natural language utterance are received in response to a capturing of an utterance from the user while the user is in proximity to the first user device and the device different than the first user device,
wherein the speech recognition is performed on the natural language utterance based on a determination that the natural language utterance is a cleaner sample of the utterance than the other natural language utterance.

20. The system of claim 16, wherein the one or more physical processors are further caused to:
obtain one or more personalized cognitive models associated with the user, wherein the one or more personalized cognitive models are based on one or more prior user inputs associated with the user, and wherein the one or more interpretations are determined further based on the one or more personalized cognitive models.

21. The system of claim 16, wherein the one or more words include a reference word, wherein the context information indicates context for the reference word, and wherein determining the one or more interpretations comprises:
identifying the reference word;
determining, based on the reference word context, an item to which the reference word refers; and
determining the one or more interpretations based on the determined item.

22. The system of claim 16, wherein the non-voice user input identifies text selected by the user, and the context information is determined based on the text.

23. The system of claim 16, wherein the non-voice user input identifies a point of focus on a user interface, and the context information is determined based on the point of focus.

24. The system of claim 16, wherein the one or more physical processors are further caused to:
determine additional context information based on one or more of the natural language utterance or the non-voice user input,
wherein the selection of the user processing device is based on the additional context information.

25. A method of natural language utterance processing, the method being implemented in a computer system that includes one or more physical processors executing one or more computer program instructions which, when executed, perform the method, the method comprising:
receiving, at the computer system, from a first user device, a natural language utterance;
processing, at the computer system, the natural language utterance to determine one or more words of the natural language utterance;
receiving, at the computer system, from a second user device, a non-voice user input that relates to the natural language utterance, wherein the first user device and the second user device are associated with a user and are independently operable of one another and of the computer system;
processing, at the computer system, the non-voice user input to determine context information for the one or more words; and
transmit, by the computer system, the one or more words and the context information to a user processing device to invoke the user processing device to determine one or more interpretations of the natural language utterance based on the one or more words and the context information, wherein the user processing device comprises the first user device, the second user device, or a third user device independently operable of the computer system.

26. The method of claim 25, wherein the natural language utterance is received at the first user device before the non-voice user input is received at the second user device.

27. The method of claim 25, wherein the natural language utterance is received at the first user device after the non-voice user input is received at the second user device.

28. The method of claim 25, further comprising:
determining, at the computer system, whether to invoke a peer-to-peer mode; and
selecting, at the computer system, based on a determination to invoke the peer-to-peer mode, the user processing device to determine the one or more interpretations of the natural language utterance based on the one or more words and the context information,
wherein the one or more words and the context information are transmitted to the user processing device based on the selection of the user processing device.

29. The method of claim 25, wherein the computer system comprises one or more servers and a virtual router that is independently operable of the one or more servers,
wherein receiving the natural language utterance comprises receiving, at the virtual router, the natural language utterance from the first user device, and
wherein receiving the non-voice input comprises receiving, at the virtual router, the non-voice user input from the second user device, the method further comprising:
transmitting, by the virtual router, the natural language utterance and the non-voice user input to the one or more servers;

receiving, at the virtual router, the one or more words and the context information from the one or more servers; and selecting, at the virtual router, from among a plurality of user processing devices, the user processing device to determine the one or more interpretations of the natural language utterance, wherein transmitting the one or more words and the context information comprises transmitting, by the virtual router, the one or more words and the context information to the selected user processing device to invoke the selected user processing device to determine the one or more interpretations of the natural language utterance based on the one or more words and the context information.

30. The method of claim 29, further comprising:

selecting, at the virtual router, from among the one or more servers and the plurality of user processing devices, the one or more servers to process the natural language utterance and the non-voice user input, wherein the natural language utterance and the non-voice user input are transmitted to the one or more servers based on the selection of the one or more servers.

31. The method of claim 29, further comprising:

receiving, at the virtual router, a second natural language utterance;

selecting, at the virtual router, based on context information associated with the second natural language utterance, at least one of the user processing device or another user processing device to determine one or more interpretations of the second natural language utterance;

transmitting, by the virtual router, the second natural language utterance to the selected at least one of the user processing devices to invoke the selected at least one of the user processing devices to determine the one or more interpretations of the second natural language utterance;

receiving, at the virtual router, from the selected at least one of the user processing devices, the one or more interpretations of the second natural language utterance; and transmitting, by the virtual router, the one or more interpretations of the second natural language utterance to one or more of the plurality of user processing devices.

* * * * *